United States Patent
Koudai et al.

(10) Patent No.: US 12,454,306 B2
(45) Date of Patent: Oct. 28, 2025

(54) VEHICLE CONTROL UNIT AND VEHICLE CONTROL METHOD

(71) Applicants: JTEKT CORPORATION, Kariya (JP); TOYOTA JIDOSHA KABUSHIKI KAISHA, Toyota (JP); DENSO CORPORATION, Kariya (JP)

(72) Inventors: Takashi Koudai, Okazaki (JP); Yuji Fujita, Okazaki (JP); Kenichi Abe, Okazaki (JP); Yugo Nagashima, Anjo (JP); Kazuma Hasegawa, Anjo (JP); Yuuta Kajisawa, Okazaki (JP); Masaharu Yamashita, Toyota (JP); Shintaro Takayama, Toyota (JP); Takeshi Iwana, Kariya (JP); Hiroki Tomizawa, Kariya (JP); Toyohiro Hayashi, Kariya (JP); Hayaki Tanabe, Kariya (JP); Nobuyori Nakajima, Kariya (JP)

(73) Assignees: JTEKT CORPORATION, Kariya (JP); TOYOTA JIDOSHA KABUSHIKI KAISHA, Toyota (JP); DENSO CORPORATION, Kariya (JP)

( * ) Notice: Subject to any disclaimer, the term of this patent is extended or adjusted under 35 U.S.C. 154(b) by 165 days.

(21) Appl. No.: 18/354,743

(22) Filed: Jul. 19, 2023

(65) Prior Publication Data

US 2024/0025471 A1    Jan. 25, 2024

(30) Foreign Application Priority Data

Jul. 21, 2022   (JP) ................................. 2022-116642

(51) Int. Cl.
*B62D 5/04* (2006.01)
*B62D 6/00* (2006.01)
*B62D 15/02* (2006.01)

(52) U.S. Cl.
CPC ............. *B62D 5/046* (2013.01); *B62D 5/043* (2013.01); *B62D 5/0463* (2013.01);
(Continued)

(58) Field of Classification Search
None
See application file for complete search history.

(56) References Cited

U.S. PATENT DOCUMENTS 9,796,415 B2 * 10/2017 Kobayashi ............... B62D 5/04
11,661,107 B2 * 5/2023 Uchino .................. B62D 6/008
                                                701/41
(Continued)

FOREIGN PATENT DOCUMENTS

EP      3023304 A1 *  5/2016 .......... G06F 11/0739
EP      3023304 B1 *  1/2018 .......... G06F 11/0739
(Continued)

OTHER PUBLICATIONS

Nov. 24, 2023 Extended European Search Report issued in European Patent Application No. 23186469.5.

*Primary Examiner* — Kevin R Steckbauer
(74) *Attorney, Agent, or Firm* — Oliff PLC

(57) ABSTRACT

A vehicle control unit includes a controller configured to make a state transition to a normal control state via a start-up state after a power source system of a vehicle is started. The start-up state is a state where it is possible to execute a preparation process, required for making a state transition to the normal control state, by controlling an operation member so as to move automatically. The controller is configured to execute, in the start-up state: a forced-ending condition determination process of determining whether a forced-ending condition showing that the preparation process being executed is to be forcedly ended from start of execution of the preparation process is met; a forced-ending process of forcedly ending the preparation process being executed
(Continued)

when the forced-ending condition is met; and a notification process of notifying the driver of forced ending of the preparation process.

9 Claims, 9 Drawing Sheets

(52) U.S. Cl.
CPC .............. *B62D 5/0481* (2013.01); *B62D 6/00* (2013.01); *B62D 15/02* (2013.01)

(56) References Cited

U.S. PATENT DOCUMENTS

| | | | | |
|---|---|---|---|---|
| 11,834,115 | B2* | 12/2023 | Kakimoto | B62D 5/0481 |
| 11,840,295 | B2* | 12/2023 | Kakimoto | B62D 6/008 |
| 12,030,559 | B2* | 7/2024 | Kakimoto | B62D 15/021 |
| 2009/0055050 | A1* | 2/2009 | Onuma | B62D 5/0481 |
| | | | | 701/41 |
| 2017/0197655 | A1* | 7/2017 | Kobayashi | B62D 5/0409 |
| 2018/0237062 | A1* | 8/2018 | Saal | B62D 5/0469 |
| 2020/0298901 | A1* | 9/2020 | Anraku | B62D 5/0421 |
| 2021/0309290 | A1* | 10/2021 | Uchino | B62D 6/002 |
| 2021/0394820 | A1* | 12/2021 | Kakimoto | B62D 15/0205 |
| 2021/0394821 | A1* | 12/2021 | Kakimoto | B62D 15/02 |
| 2021/0394825 | A1* | 12/2021 | Kakimoto | B62D 15/0205 |
| 2021/0394826 | A1* | 12/2021 | Kakimoto | B62D 6/008 |
| 2022/0253053 | A1* | 8/2022 | Niwa | B60W 60/007 |
| 2022/0388569 | A1* | 12/2022 | Uchino | B62D 5/0463 |
| 2023/0011119 | A1* | 1/2023 | Uchino | B62D 6/008 |
| 2024/0025471 | A1* | 1/2024 | Koudai | B62D 5/046 |
| 2024/0025473 | A1* | 1/2024 | Koudai | B62D 5/0481 |
| 2024/0124047 | A1* | 4/2024 | Matsumoto | B62D 5/006 |

FOREIGN PATENT DOCUMENTS

| | | | | |
|---|---|---|---|---|
| EP | 3 929 061 A1 | | 12/2021 | |
| EP | 3925862 A1 | * | 12/2021 | ............ B62D 6/008 |
| EP | 4309974 A1 | * | 1/2024 | ............ B62D 15/02 |
| EP | 3925862 B1 | * | 4/2024 | ............ B62D 5/046 |
| JP | 2021-195086 A | | 12/2021 | |

* cited by examiner

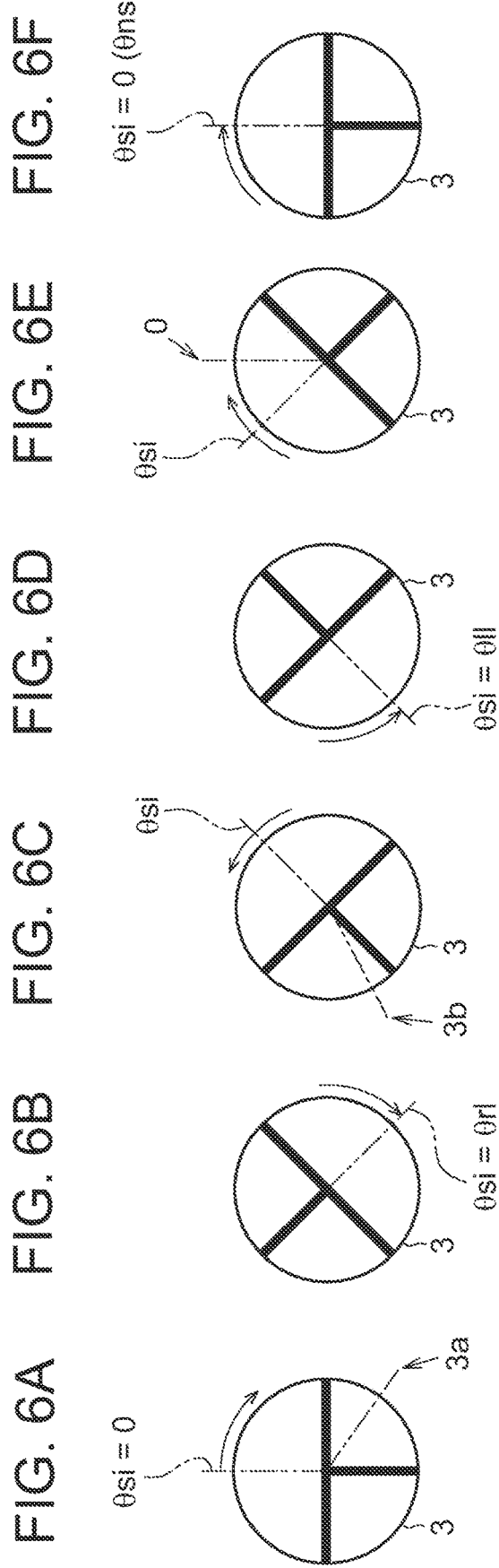
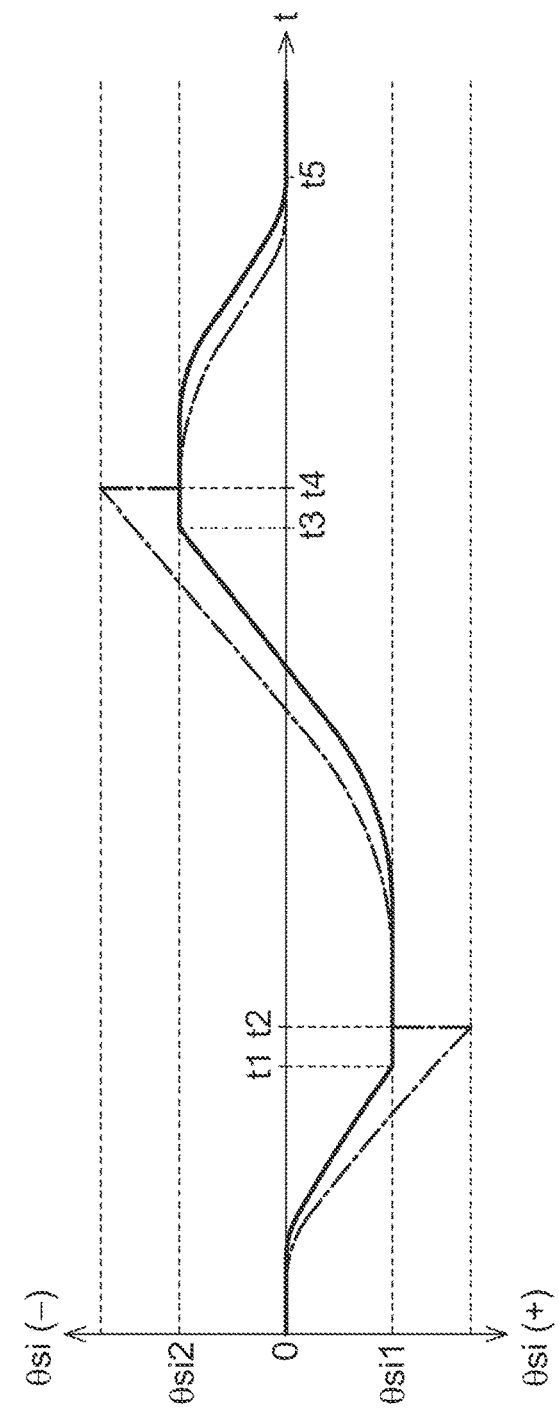

FIG. 11
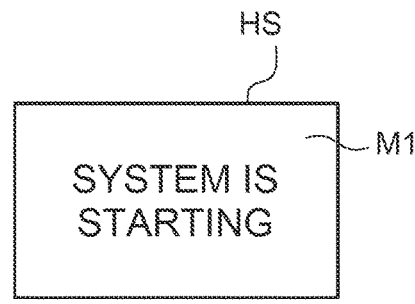
FIG. 12A
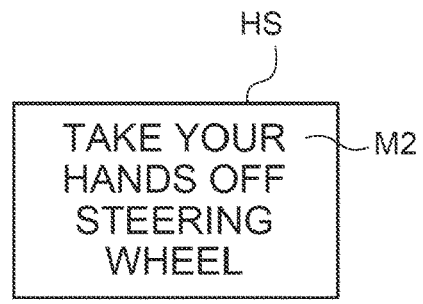
FIG. 12B
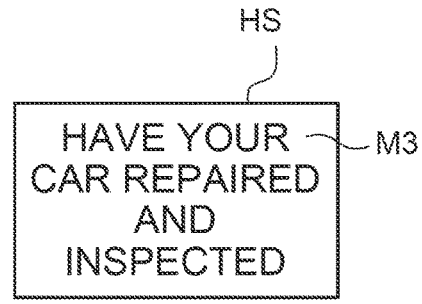
FIG. 12C
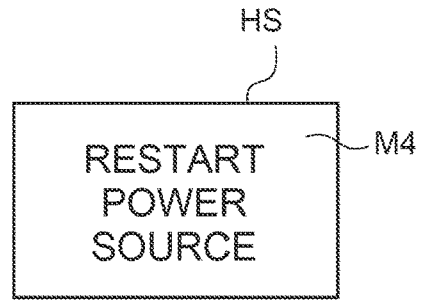
FIG. 12D

VEHICLE CONTROL UNIT AND VEHICLE CONTROL METHOD

CROSS-REFERENCE TO RELATED APPLICATION

This application claims priority to Japanese Patent Application No. 2022-116642 filed on Jul. 21, 2022, incorporated herein by reference in its entirety.

BACKGROUND

1. Technical Field

The present disclosure relates to a vehicle control unit and a vehicle control method.

2. Description of Related Art

For example, Japanese Unexamined Patent Application Publication No. 2021-195086 describes a steer-by-wire steering device that is installed in a vehicle. The steer-by-wire steering device has a structure in which a power transmission path between a steering wheel of the vehicle and turning wheels of the vehicle is cut off. The vehicle includes a reaction force controller and a turning controller that control this steer-by-wire steering device.

The reaction force controller is configured to execute an adjustment process of automatically adjusting the rotational position of the steering wheel. When automatic rotation of the steering wheel is hindered during execution of the adjustment process, the reaction force controller relieves discomfort for the driver upon that hindered state being resolved.

SUMMARY

The above-described adjustment process is a process that enables control of the steering device etc. during travel of the vehicle. If the reaction force controller is unable to complete the adjustment process as, for example, execution of the adjustment process, i.e., automatic rotation of the steering wheel is hindered, a period until control of the steering device etc. during travel of the vehicle becomes possible is likely to become prolonged. Prolongation of the period until control of the steering device etc. during travel of the vehicle becomes possible constitutes a cause of anxiety for the driver who cannot learn the reason.

A vehicle control unit that solves the above-described problem controls a steering device of a vehicle. The steering device has a structure in which a power transmission path between a steering unit having an operation member and a turning unit configured to turn turning wheels is cut off. The vehicle control unit has a controller configured to make a state transition to a normal control state via a start-up state after a power source system of the vehicle is started. The start-up state is a state where it is possible to execute a preparation process, required for making a state transition to the normal control state, by controlling the operation member so as to move automatically. The normal control state is a state where it is possible to execute a normal process for turning the turning wheels according to operation of the operation member by a driver. The controller is configured to execute, in the start-up state: a forced-ending condition determination process of determining whether a forced-ending condition showing that the preparation process being executed is to be forcedly ended from start of execution of the preparation process is met; a forced-ending process of forcedly ending the preparation process being executed when the forced-ending condition is met; and a notification process of notifying the driver of forced ending of the preparation process.

A vehicle control method that can solve the above-described problem is a method for controlling a steering device of a vehicle. The steering device has a structure in which a power transmission path between a steering unit having an operation member and a turning unit configured to turn turning wheels is cut off. The vehicle control method includes making a state transition to a normal control state via a start-up state after a power source system of the vehicle is started. The start-up state is a state where it is possible to execute a preparation process, required for making a state transition to the normal control state, by controlling the operation member so as to move automatically. The normal control state is a state where it is possible to execute a normal process for turning the turning wheels according to operation of the operation member by a driver. The vehicle control method includes executing the following in the start-up state: a forced-ending condition determination process of determining whether a forced-ending condition showing that the preparation process being executed is to be forcedly ended from start of execution of the preparation process is met; a forced-ending process of forcedly ending the preparation process being executed when the forced-ending condition is met; and a notification process of notifying the driver of forced ending of the preparation process.

According to the configuration and the method described above, even when the preparation process is being executed, the controller can forcedly end the preparation process being executed if the forced-ending condition is met. When forcedly ending the preparation process, the controller executes the notification process of notifying the driver to that effect. For example, when the preparation process being executed is forcedly ended, a period until a normal process for the steering device becomes possible becomes prolonged. In this case, the driver can learn that the reason why the period until the normal process for the steering device becomes possible is being prolonged is due to forced ending of the preparation process being executed. Thus, even when the period until the normal process for the steering device becomes possible is being prolonged, the driver is less likely to feel anxiety.

In the above-described vehicle control unit, the controller may include a steering controller that mainly executes control of the steering device and a vehicle controller that mainly executes control other than control of the steering device. In this configuration, the forced-ending condition determination process, the forced-ending process, and the notification process that are executed in relation to the preparation process can be allocated as functions of the steering controller or the vehicle controller. Thus, functions of the steering controller or the vehicle controller can be appropriately allocated.

For example, in the case where the vehicle includes a notification device provided independently of the steering device, and the notification device is configured to, when the forced-ending condition is met, execute notification to the driver that the preparation process being executed is to be forcedly ended, the vehicle control unit can be embodied as follows: The steering controller is configured to execute the forced-ending condition determination process, the forced-ending process, and some processes of the notification process. The vehicle controller is configured to execute remaining processes of the notification process other than the some processes. The some processes include a notification content specification process of specifying a notification content showing a content to be notified to the driver. The remaining processes include a notification control process of controlling the notification device so as to make a notification according to the notification content specified by the notification content specification process.

In the above-described vehicle control unit, the controller may include executing, in the start-up state, a cause-for-ending determination process of determining a cause due to which the forced-ending condition is met. The notification content specification process may be a process of specifying, based on the cause due to which the forced-ending condition is met, the notification contents that are different from one another, and the notification content may include a content that allows a driver to be prompted to act subsequently according to the cause due to which the forced-ending condition is met.

This configuration allows the driver to learn the cause when the preparation process is forcedly ended. In this case, the driver can take measures according to the cause. This is effective for eliminating anxiety caused to the driver when the period until the normal process for the steering device becomes possible is being prolonged.

In the above-described vehicle control unit, the operation member may be a steering wheel capable of rotating in leftward and rightward directions. The preparation process may include a correction process and a synchronization process. The correction process may include a process of calculating a reference position for defining a rotational position of the steering wheel by automatically rotating the steering wheel. The synchronization process may include a process of synchronizing the rotational position of the steering wheel and a turning position of the turning wheels by automatically rotating the steering wheel such that a positional relationship between the rotational position and the turning position corresponds to a predetermined positional relationship. The forced-ending condition may include conditions that a condition of the correction process differs from a condition of the synchronization process.

According to this configuration, in the case where the preparation process includes the correction process and the synchronization process, a different forced-ending condition can be used for each of these processes. Thus, the forced-ending condition can be rationalized.

The present disclosure can make anxiety less likely to be caused to the driver.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 6A is a view showing motion of a steering wheel during the steering angle midpoint correction process on the steering side of FIG. 3;

FIG. 6B is a view showing motion of the steering wheel during the steering angle midpoint correction process on the steering side of FIG. 3;

FIG. 6C is a view showing motion of the steering wheel during the steering angle midpoint correction process on the steering side of FIG. 3;

FIG. 6D is a view showing motion of the steering wheel during the steering angle midpoint correction process on the steering side of FIG. 3;

FIG. 6E is a view showing motion of the steering wheel during the steering angle midpoint correction process on the steering side of FIG. 3;

FIG. 6F is a view showing motion of the steering wheel during the steering angle midpoint correction process on the steering side of FIG. 3;

FIG. 6G is a graph showing changes in a temporary steering angle $\theta si$ and a steering target angle $\theta s^*$;

FIG. 11 is a chart showing how states relating to notification to a driver in the start-up state change;

FIG. 12A is a view illustrating a notification content relating to notification to the driver;

FIG. 12B is a view illustrating a notification content relating to notification to the driver;

FIG. 12C is a view illustrating a notification content relating to notification to the driver; and FIG. 12D is a view illustrating a notification content relating to notification to the driver.

DETAILED DESCRIPTION OF EMBODIMENTS

Figure 1:
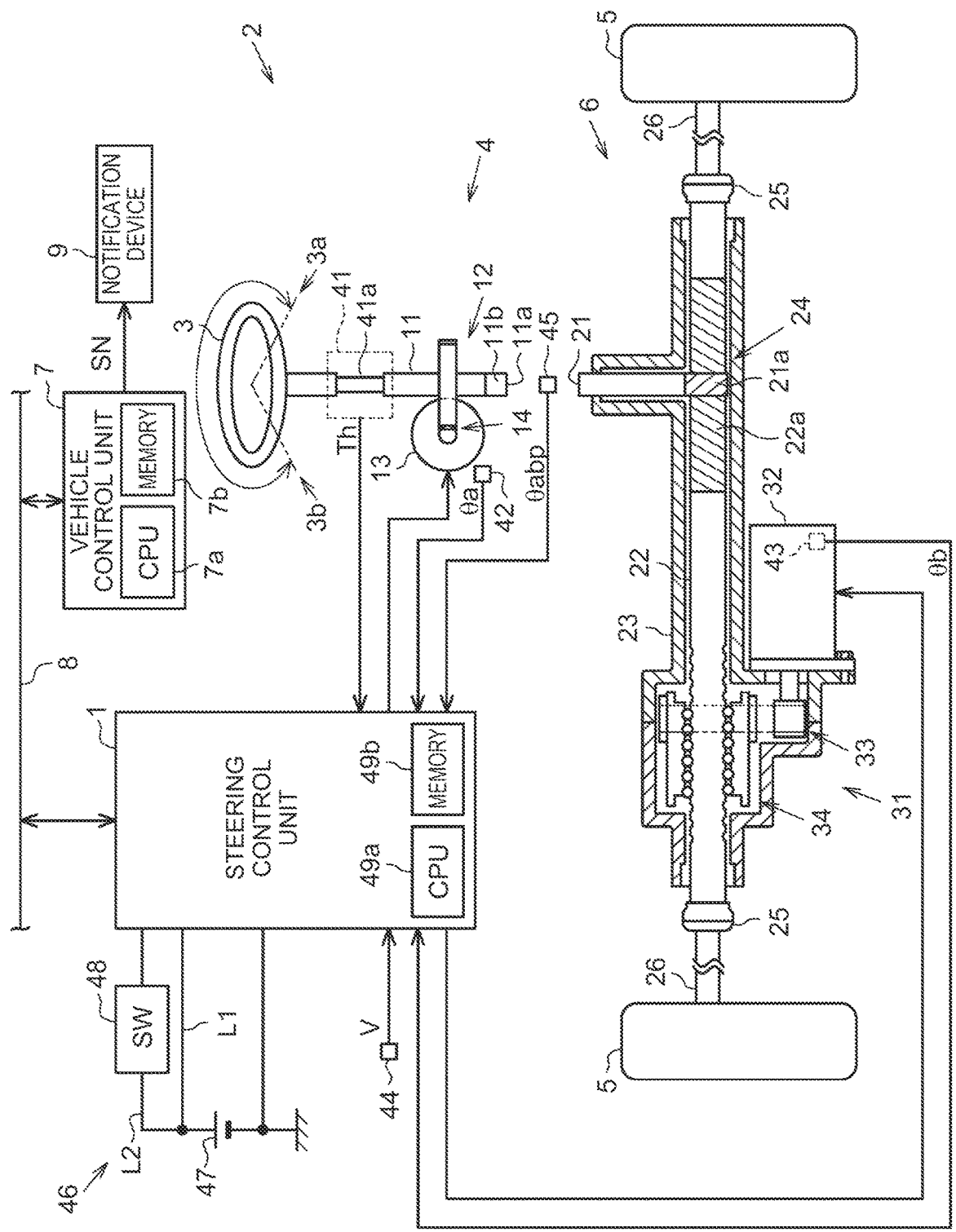
FIG. 1 is a diagram showing the configuration of a steer-by-wire steering device.

An embodiment of the present disclosure will be described below. As shown in FIG. 1, a steering control unit 1 is one example of the vehicle control unit that controls a steering device 2 as a target. The steering device 2 is configured as a steer-by-wire vehicle steering device. The steering device 2 includes a steering unit 4 and a turning unit 6. The steering unit 4 is steered by a driver through a steering wheel 3 of the vehicle that is an operation member. The turning unit 6 turns left and right turning wheels 5 of the vehicle according to steering input into the steering unit 4 by the driver. The steering device 2 of this embodiment has, for example, a structure in which a power transmission path between the steering unit 4 and the turning unit 6 is always mechanically cut off. In this structure, a power transmission path between a steering actuator 12, to be described later, and a turning actuator 31, to be described later, is always mechanically cut off.

The steering unit 4 includes a steering shaft 11 and the steering actuator 12. The steering shaft 11 is coupled to the steering wheel 3. An end portion 11a of the steering shaft 11 on the opposite side from the side coupled to the steering wheel 3 has a stopper mechanism 11b. The stopper mechanism 11b defines a rotation range of the steering shaft 11. Thus, a rotation range of the steering wheel 3 that rotates integrally with the steering shaft 11 is defined by the stopper mechanism 11b. For example, the steering wheel 3 can rotate between a rightward rotation limit position 3a and a leftward rotation limit position 3b as the rotation range. The steering actuator 12 has a steering-side motor 13 that is a driving source, and a steering-side speed reduction mechanism 14. The steering-side motor 13 is a reaction force motor that applies a steering reaction force, which is a force acting against steering, to the steering wheel 3 through the steering shaft 11. The steering-side motor 13 is coupled to the steering shaft 11 through the steering-side speed reduction mechanism 14 that is formed by, for example, a worm and wheel. As the steering-side motor 13 of this embodiment, for example, a three-phase brushless motor is adopted.

The turning unit 6 includes a pinion shaft 21, a rack shaft 22 as a turning shaft, and a rack housing 23. The pinion shaft 21 and the rack shaft 22 are coupled together at a predetermined intersection angle. Pinion teeth 21a formed on the pinion shaft 21 and rack teeth 22a formed on the rack shaft 22 are meshed with each other to form a rack-and-pinion mechanism 24. Thus, the pinion shaft 21 corresponds to a rotating shaft of which the angle can be converted into a turning angle $\theta i$ that is a turning position of the turning wheels 5. The rack housing 23 houses the rack-and-pinion mechanism 24. One end of the pinion shaft 21 on the opposite side from the side coupled to the rack shaft 22 protrudes from the rack housing 23. Both ends of the rack shaft 22 protrude from both ends of the rack housing 23 in an axial direction. At both ends of the rack shaft 22, tie rods 26 are coupled through rack ends 25 formed by ball joints. Leading ends of the tie rods 26 are coupled to knuckles (not shown) on which the left and right turning wheels 5 are respectively mounted.

The turning unit 6 includes the turning actuator 31. The turning actuator 31 includes a turning-side motor 32 that is a driving source, a transmission mechanism 33, and a conversion mechanism 34. The turning-side motor 32 applies a turning force for turning the turning wheels 5 to the rack shaft 22 through the transmission mechanism 33 and the conversion mechanism 34. The turning-side motor 32 transmits rotation to the conversion mechanism 34 through the transmission mechanism 33 that is formed by, for example, a belt transmission mechanism. The transmission mechanism 33 converts rotation of the turning-side motor 32 into reciprocating motion of the rack shaft 22 through the conversion mechanism 34 that is formed by, for example, a ball screw mechanism. As the turning-side motor 32 of this embodiment, for example, a three-phase brushless motor is adopted.

In the steering device 2 thus configured, the turning angle $\theta i$ of the turning wheels 5 is changed as a motor torque is applied as a turning force from the turning actuator 31 to the rack shaft 22 according to the driver's steering operation. Meanwhile, a steering reaction force that acts against the driver's steering is applied from the steering actuator 12 to the steering wheel 3. As a result, in the steering device 2, a steering torque Th required to steer the steering wheel 3 is changed by the steering reaction force that is a motor torque applied from the steering actuator 12.

The reason for providing the pinion shaft 21 is to support the rack shaft 22 inside the rack housing 23 along with the pinion shaft 21. By a support mechanism (not shown) provided in the steering device 2, the rack shaft 22 is supported so as to be movable along its axial direction as well as is pressed toward the pinion shaft 21. Thus, the rack shaft 22 is supported inside the rack housing 23. However, another support mechanism that supports the rack shaft 22 in the rack housing 23 without using the pinion shaft 21 may be provided.

Electrical Configuration of Steering Device

As shown in FIG. 1, the steering-side motor 13 and the turning-side motor 32 are connected to the steering control unit 1. The steering control unit 1 controls operation of the steering-side motor 13 and the turning-side motor 32.

Detection results of various sensors are input into the steering control unit 1. The various sensors are connected to the steering control unit 1. The various sensors include, for example, a torque sensor 41, a steering-side rotation angle sensor 42, a turning-side rotation angle sensor 43, a vehicle speed sensor 44, and a pinion absolute angle sensor 45.

The torque sensor 41 detects the steering torque Th that is a value indicating a torque having been applied to the steering shaft 11 by the driver's steering operation. The steering-side rotation angle sensor 42 detects a rotation angle $\theta a$ that is an angle of a rotating shaft of the steering-side motor 13 within a range of 360°. The turning-side rotation angle sensor 43 detects a rotation angle $\theta b$ that is an angle of a rotating shaft of the turning-side motor 32 within a range of 360°. The vehicle speed sensor 44 detects a vehicle speed V that is a travel speed of the vehicle. The pinion absolute angle sensor 45 detects a pinion absolute rotation angle $\theta abp$ that is an actually measured value of the angle of a rotational axis of the pinion shaft 21 within a range exceeding 360°.

Specifically, the torque sensor 41 is provided on the steering shaft 11, at a part on the side of the steering wheel 3 relative to the steering-side speed reduction mechanism 14. The torque sensor 41 detects the steering torque Th based on twisting of a torsion bar 41a that is provided at an intermediate portion of the steering shaft 11. The steering torque Th is detected, for example, as a positive value when the vehicle is steered rightward and as a negative value when the vehicle is steered leftward.

The steering-side rotation angle sensor 42 is provided in the steering-side motor 13. The rotation angle $\theta a$ of the steering-side motor 13 is used to calculate a steering angle $\theta s$. The steering-side motor 13 and the steering shaft 11 operate in conjunction with each other through the steering-side speed reduction mechanism 14. Thus, there is a correlation between the rotation angle $\theta a$ of the steering-side motor 13 and the rotation angle of the steering shaft 11. Further, there is a correlation between the rotation angle $\theta a$ of the steering-side motor 13 and the steering angle $\theta s$ that is a rotation angle indicating the rotational position of the steering wheel 3. Therefore, the steering angle $\theta s$ can be calculated based on the rotation angle $\theta a$ of the steering-side motor 13. The rotation angle $\theta a$ is detected, for example, as a positive value when the vehicle is steered rightward and as a negative value when the vehicle is steered leftward.

The turning-side rotation angle sensor 43 is provided in the turning-side motor 32. The rotation angle $\theta b$ of the turning-side motor 32 is used to calculate a pinion angle $\theta p$. The turning-side motor 32 and the pinion shaft 21 operate in conjunction with each other through the transmission mechanism 33, the conversion mechanism 34, and the rack-and-pinion mechanism 24. Thus, there is a correlation between the rotation angle θb of the turning-side motor 32 and the pinion angle θp that is the rotation angle of the pinion shaft 21. Therefore, the pinion angle θp can be obtained based on the rotation angle θb of the turning-side motor 32. The pinion shaft 21 is meshed with the rack shaft 22. Thus, there is also a correlation between the pinion angle θp and the amount of movement of the rack shaft 22. The pinion angle θp is angle information indicating the turning state of the turning wheels 5 and is a value reflecting the turning angle θi that is the turning position of the turning wheels 5. The rotation angle θb is detected, for example, as a positive value when the vehicle is steered rightward and as a negative value when the vehicle is steered leftward.

The pinion absolute angle sensor 45 is provided on the pinion shaft 21. The pinion absolute rotation angle θabp of the pinion shaft 21 is used to calculate the pinion angle θp. The pinion absolute rotation angle θabp is detected, for example, as a positive value when the vehicle is steered rightward and as a negative value when the vehicle is steered leftward. In this embodiment, the pinion absolute angle sensor 45 is one example of the sensor that detects an actually measured value of the pinion angle θp.

A power source system 46 is connected to the steering control unit 1. The power source system 46 has a battery 47. The battery 47 is a secondary battery installed in the vehicle, and serves as an electric power source of electric power that is supplied for the steering-side motor 13 and the turning-side motor 32 to operate. Further, the battery 47 serves as an electric power source of electric power that is supplied for the steering control unit 1 to operate.

A start switch 48 ("SW" in FIG. 1) of the vehicle, such as an ignition switch, is provided between the steering control unit 1 and the battery 47. Of two power supply lines L1, L2 connecting the steering control unit 1 and the battery 47 to each other, the start switch 48 is provided at an intermediate point of the power supply line L2 that branches off from the power supply line L1. The start switch 48 is operated when starting various functions to operate a travel driving source of the vehicle, such as an engine, and allow the vehicle to operate. Conduction of the power supply line L2 is turned on and off through operation of the start switch 48. In this embodiment, the operation state of the steering device 2 is linked to the operation state of the vehicle. As for the power supply line L1, conduction of the power supply line L1 is basically always on, and is indirectly turned on and off as a function of the steering device 2 according to the operation state of the steering device 2. The operation state of the steering device 2 is linked to on and off states of conduction of the power supply lines L1, L2 that are supply states of electric power of the battery 47.

A vehicle control unit 7 is connected to the steering control unit 1 through an on-board network 8, such as a CAN. The vehicle control unit 7 is one example of the external vehicle control unit that is provided in the vehicle equipped with the steering device 2, separately from the steering control unit 1. The vehicle control unit 7 controls operation of a notification device 9 installed in the vehicle. The notification device 9 may include a display device that notifies information by appealing to the visual sense of the driver, an alarm device that notifies information by appealing to the acoustic sense of the driver, or a physical sensation generation device that notifies information to the driver through physical sensation. The display device includes a head-up display (HUD), a meter panel, a display of a navigation system, and a light emitting diode (LED). The alarm device includes a speaker or a buzzer. The physical sensation generation device includes a vibration device that vibrates a vehicle accessory that comes into contact with the driver, such as a seat. The vehicle control unit 7 generates a notification control signal SN for the notification device 9. The vehicle control unit 7 includes a device that controls a drive system involved in travel of the vehicle, a device that controls a brake system involved in braking of the vehicle, and other devices.

Functions of Steering Control Unit

The steering control unit 1 includes a central processing unit (hereinafter referred to as a "CPU") 49a and a memory 49b. The steering control unit 1 executes various processes as the CPU 49a executes programs stored in the memory 49b on a predetermined arithmetic operation cycle. The CPU 49a and the memory 49b constitute a microcomputer that is a processing circuit. The memory 49b includes computer-readable media, such as a random-access memory (RAM) and a read-only memory (ROM). However, that various processes are realized by software is one example. The processing circuit belonging to the steering control unit 1 may be configured such that at least some of the processes are realized by a hardware circuit, such as a logic circuit.

The vehicle control unit 7 includes a central processing unit (hereinafter referred to as a "CPU") 7a and a memory 7b. The vehicle control unit 7 executes various processes as the CPU 7a executes programs stored in the memory 7b on a predetermined arithmetic operation cycle. Like the CPU 49a and the memory 49b, the CPU 7a and the memory 7b constitute a microcomputer that is a processing circuit. The memory 7b includes computer-readable media, such as a random-access memory (RAM) and a read-only memory (ROM). However, that various processes are realized by software is one example. The processing circuit belonging to the vehicle control unit 7 may be configured such that at least some of the processes are realized by a hardware circuit, such as a logic circuit.

Figure 2:
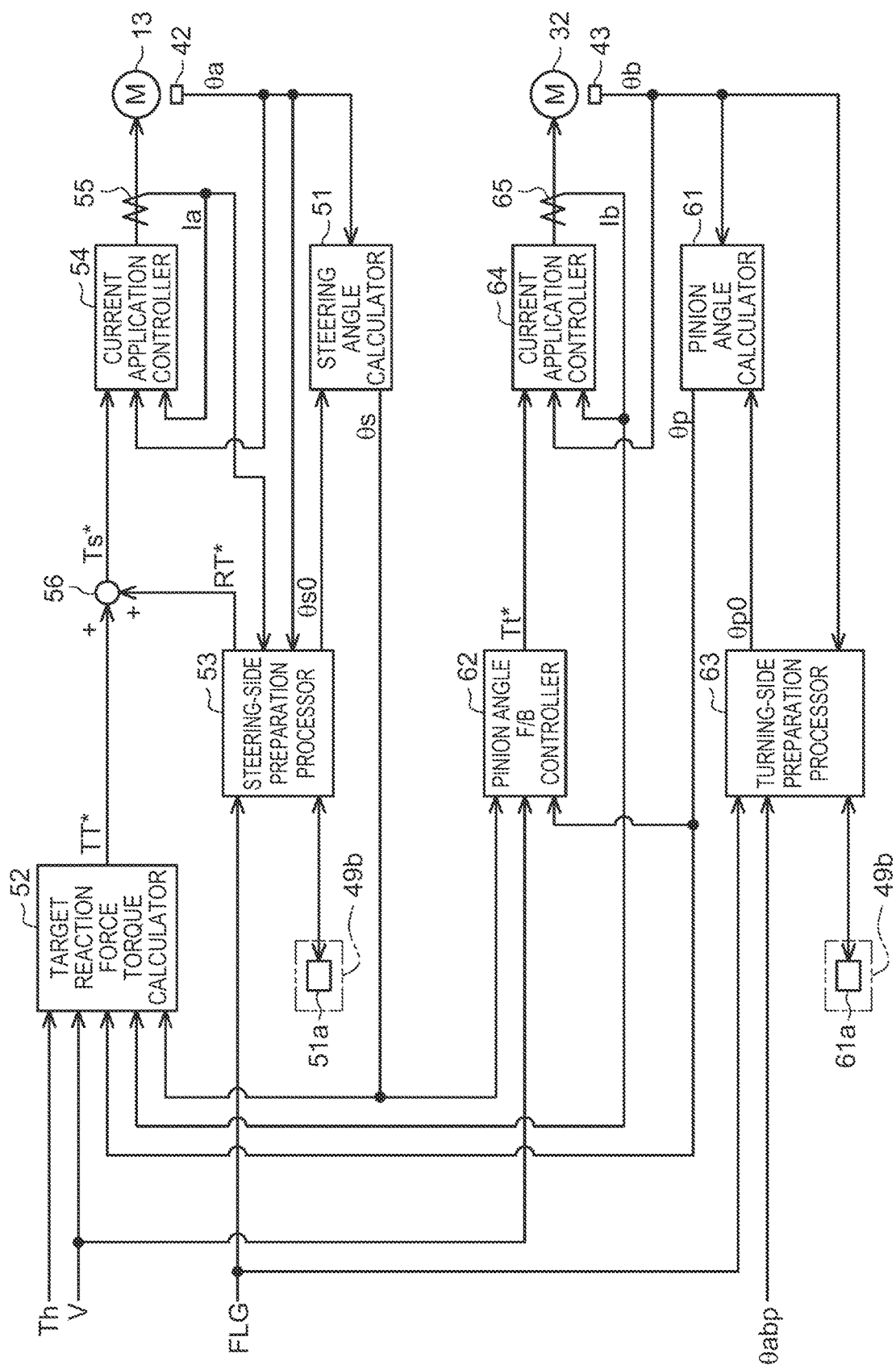
FIG. 2 is a block diagram showing processes executed by a steering control unit of FIG. 1.

FIG. 2 shows some of the processes executed by the steering control unit 1. The processes shown in FIG. 2 are some of the processes that are realized as the CPU 49a executes programs stored in the memory 49b, and these processes are depicted according to the type of process to be realized. In this embodiment, the CPU 49a is one example of the steering controller. The CPU 7a is one example of the vehicle controller. Thus, the CPU 49a and the CPU 7a each constitute a controller as one example.

The steering control unit 1 controls power supply to the steering-side motor 13. The steering control unit 1 has a steering-side current sensor 55. The steering-side current sensor 55 detects a steering-side actual current value Ia that is obtained from a value of a current in each phase of the steering-side motor 13 that flows through a connection line between a steering-side current application controller 54 and a motor coil in each phase of the steering-side motor 13. The steering-side current sensor 55 acquires, as a current, a voltage drop of a shunt resistor that is connected to a source side of each switching element in an inverter (not shown) that is provided so as to correspond to the steering-side motor 13. In FIG. 2, for the convenience of description, the connection lines in the respective phases and the current sensors in the respective phases are collectively shown as one connection line and one current sensor.

The steering control unit 1 controls power supply to the turning-side motor 32. The steering control unit 1 has a turning-side current sensor 65. The turning-side current sensor 65 detects a turning-side actual current value Ib that is obtained from a value of a current in each phase of the turning-side motor 32 that flows through a connection line between a turning-side current application controller 64 and a motor coil in each phase of the turning-side motor 32. The turning-side current sensor 65 acquires, as a current, a voltage drop of a shunt resistor that is connected to a source side of each switching element in an inverter (not shown) that is provided so as to correspond to the turning-side motor 32. In FIG. 2, for the convenience of description, the connection lines in the respective phases and the current sensors in the respective phases are collectively shown as one connection line and one current sensor.

As shown in FIG. 2, the steering control unit 1 has a steering angle calculator 51, a target reaction force torque calculator 52, a steering-side preparation processor 53, and the steering-side current application controller 54. The steering control unit 1 has a pinion angle calculator 61, a pinion angle feedback controller ("PINION ANGLE FB CONTROLLER" in FIG. 2) 62, a turning-side preparation processor 63, and the turning-side current application controller 64.

The rotation angle θa and a set steering angle θs0 are input into the steering angle calculator 51. The steering angle calculator 51 converts the rotation angle θa obtained based on the set steering angle θs0 into an integrated angle from steering-side midpoint information θns that is stored in a storage 51a. The integrated angle is a value obtained by counting the number of revolutions of the steering-side motor 13 from the steering-side midpoint information θns and converting it within a range exceeding 360°. The set steering angle θs0 is calculated by the steering-side preparation processor 53. The steering-side midpoint information θns is, for example, information indicating a steering neutral position, i.e., a reference position, that is the rotational position of the steering wheel 3 when the vehicle is moving straight ahead. The storage 51a is a predetermined storage area of the memory 49b. The steering angle calculator 51 calculates the steering angle θs by multiplying the integrated angle, obtained by conversion, by a conversion factor based on a rotation speed ratio of the steering-side speed reduction mechanism 14. The steering angle calculator 51 calculates the steering angle θs as an absolute angle relative to the steering neutral position. The steering angle θs thus obtained is output to the target reaction force torque calculator 52 and the pinion angle feedback controller 62.

The steering torque Th, the vehicle speed V, the turning-side actual current value Ib, the steering angle θs, and the pinion angle θp are input into the target reaction force torque calculator 52. Based on the steering torque Th, the vehicle speed V, the turning-side actual current value Ib, the steering angle θs, and the pinion angle θp, the target reaction force torque calculator 52 calculates a target reaction force torque TT*. The target reaction force torque TT* is a control amount serving as a target of a steering reaction force for the steering wheel 3 that should be generated through the steering-side motor 13. The target reaction force torque TT* thus obtained is output to an adder 56.

The steering torque Th, the rotation angle θa, the steering-side actual current value Ia, the steering-side midpoint information θns, the pinion angle θp, and battery replacement information FLG are input into the steering-side preparation processor 53. Based on the steering torque Th, the rotation angle θa, the steering-side actual current value Ia, the steering-side midpoint information θns, the pinion angle θp, and the battery replacement information FLG, the steering-side preparation processor 53 executes a steering angle midpoint correction process and a steering angle synchronization process that are required for enabling control of the steering device 2.

In the steering angle midpoint correction process, a process on the steering side includes a process of calculating the steering-side midpoint information θns and the set steering angle θs0. The steering-side midpoint information θns is written into the storage 51a. The set steering angle θs0 is output to the steering angle calculator 51. In the steering angle synchronization process, a process on the steering side includes a process of synchronizing the steering angle θs and the pinion angle θp such that the relationship therebetween meets a predetermined correspondence relationship. The processes on the steering side in the steering angle midpoint correction process and the steering angle synchronization process will be described in detail later.

The battery replacement information FLG is information indicating whether the vehicle is in a state after the battery 47 belonging to the power source system 46 has been removed and replaced. In the case where the start switch 48 is switched to the on state after the battery 47 is removed and replaced, the power source system 46 sets a value "1" as the battery replacement information FLG. The battery replacement information FLG of the value "1" indicates that the power source is started for the first time since battery replacement. In the case where the start switch 48 is switched to the on state without the battery 47 having been removed and replaced, the power source system 46 sets a value "0" as the battery replacement information FLG. The battery replacement information FLG of the value "0" indicates that the power source is started not for the first time since battery replacement. The battery replacement information FLG thus obtained is output to the steering control unit 1 through a dedicated signal line.

When calculating the steering-side midpoint information θns through the steering angle midpoint correction process, the steering-side preparation processor 53 calculates a target rotation torque RT* based on the rotation angle θa and the steering-side actual current value Ia. Further, when executing the steering angle synchronization process, the steering-side preparation processor 53 calculates a target rotation torque RT* based on the rotation angle θa and the pinion angle θp. The target rotation torque RT* is a control amount serving as a target of a rotation force for the steering wheel 3 that should be generated through the steering-side motor 13. The target rotation torque RT* thus obtained is output to the adder 56.

The target reaction force torque TT* and the target rotation torque RT* are input into the adder 56. The adder 56 calculates a steering-side motor torque command value Ts* by adding up the target reaction force torque TT* and the target rotation torque RT*. As the value of the target reaction force torque TT*, a value other than "0" is calculated when giving the driver an appropriate sense of resistance according to a road surface reaction force in the case where a normal process for turning the turning wheels 5 according to the driver's steering operation is executed. As the value of the target rotation torque RT*, a value other than "0" is calculated when applying a rotation torque for rotating the steering wheel 3 in the case where the steering angle midpoint correction process or the steering angle synchronization process is executed. Thus, the steering-side motor torque command value Ts* is the target reaction force torque TT* in the case where the normal process is executed. The steering-side motor torque command value Ts* is the target rotation torque RT* in the case where the steering angle midpoint correction process or the steering angle synchronization process is executed. The steering-side motor torque command value Ts* thus obtained is output to the steering-side current application controller 54.

The steering-side motor torque command value Ts*, the rotation angle θa, and the steering-side actual current value Ia are input into the steering-side current application controller 54. Based on the steering-side motor torque command value Ts*, the steering-side current application controller 54 calculates a current command value Ia* for the steering-side motor 13. The steering-side current application controller 54 obtains a difference between the current command value Ia* and a current value in a dq coordinate system that is obtained by converting the steering-side actual current value Ia based on the rotation angle θa, and controls power supply to the steering-side motor 13 so as to eliminate this difference. As a result, the steering-side motor 13 generates a torque according to the steering-side motor torque command value Ts*.

The rotation angle θb and the set pinion angle θp0 are input into the pinion angle calculator 61. The pinion angle calculator 61 converts the rotation angle θb obtained based on the set pinion angle θp0 into an integrated angle from turning-side midpoint information θnt that is stored in a storage 61a. The integrated angle is a value obtained by counting the number of revolutions of the turning-side motor 32 from the turning-side midpoint information θnt and converting it within a range exceeding 360°. The set pinion angle θp0 is calculated by the turning-side preparation processor 63. The turning-side midpoint information θnt is, for example, information indicating a rack neutral position, i.e., a reference position, that is the position of the rack shaft 22 when the vehicle is moving straight ahead. The storage 61a is a predetermined storage area of the memory 49b. The pinion angle calculator 61 calculates the pinion angle θp that is the actual rotation angle of the pinion shaft 21 by multiplying the integrated angle, obtained by conversion, by a conversion factor based on a rotation speed ratio of the transmission mechanism 33, a lead of the conversion mechanism 34, and a rotation speed ratio of the rack-and-pinion mechanism 24. Thus, the pinion angle calculator 61 calculates the pinion angle θp as an absolute angle relative to the rack neutral position. The pinion angle θp thus obtained is output to the pinion angle feedback controller 62 and the target reaction force torque calculator 52.

The vehicle speed V, the steering angle θs, and the pinion angle θp are input into the pinion angle feedback controller 62. The pinion angle feedback controller 62 calculates a turning-side motor torque command value Tt* through feedback control of the pinion angle θp so as to adapt the pinion angle θp to the pinion target angle θp*. The pinion target angle θp* is calculated as an angle converted into the scale of the pinion angle θp taking into account a steering angle ratio that is a ratio between the steering angle θs and the pinion angle θp relative to the steering angle θs. The pinion angle feedback controller 62 changes the steering angle ratio according to the vehicle speed V. For example, the pinion angle feedback controller 62 changes the steering angle ratio such that the pinion angle θp changes in response to a change in the steering angle θs by a greater amount when the vehicle speed V is low than when it is high. Thus, in the calculation of the pinion target angle θp*, a conversion calculation is performed such that the positional relationship with the steering angle θs meets a predetermined correspondence relationship.

As the value of the turning-side motor torque command value Tt*, a value other than "0" is calculated when turning the turning wheels 5 in the case where the normal process for turning the turning wheels 5 according to the driver's steering operation is executed. As the value of the turning-side motor torque command value Tt*, "0" is calculated in the case where the steering angle midpoint correction process or the steering angle synchronization process is executed. The turning-side motor torque command value Tt* thus obtained is output to the turning-side current application controller 64.

The rotation angle θb, the turning-side midpoint information θnt, the pinion absolute rotation angle θabp, and the battery replacement information FLG are input into the turning-side preparation processor 63. Based on the rotation angle θb, the turning-side midpoint information θnt, the pinion absolute rotation angle θabp, and the battery replacement information FLG, the turning-side preparation processor 63 executes the steering angle midpoint correction process and the steering angle synchronization process required for enabling control of the steering device 2.

In the steering angle midpoint correction process, a process on the turning side includes a process of calculating the turning-side midpoint information θnt and the set pinion angle θp0. The turning-side midpoint information θnt is written into the storage 61a. The set pinion angle θp0 is output to the pinion angle calculator 61. In the steering angle synchronization process, a process on the turning side includes a process of synchronizing the steering angle θs and the pinion angle θp such that the relationship therebetween meets a predetermined correspondence relationship. The processes on the turning side in the steering angle midpoint correction process and the steering angle synchronization process will be described in detail later.

The turning-side motor torque command value Tt*, the rotation angle θb, and the turning-side actual current value Ib are input into the turning-side current application controller 64. Based on the turning-side motor torque command value Tt*, the turning-side current application controller 64 calculates a current command value Ib* for the turning-side motor 32. The turning-side current application controller 64 obtains a difference between the current command value Ib* and a current value in a dq coordinate system that is obtained by converting the turning-side actual current value Ib based on the rotation angle θb, and controls power supply to the turning-side motor 32 so as to eliminate this difference. As a result, the turning-side motor 32 rotates by an angle according to the turning-side motor torque command value Tt*.

Process Executed in Start-Up State

After the start switch 48 is turned on and the power source system 46 of the vehicle is started based on a request from the driver by switch operation etc., the CPU 49a makes a state transition to a normal control state via a start-up state. A start signal Sig is a signal showing an on or off state of the start switch 48. After the start signal Sig is input, the CPU 49a makes a state transition to a start-up state to execute the steering angle midpoint correction process and the steering angle synchronization process. In the start-up state, the vehicle is stationary. Further, in the start-up state, the CPU 49a is in a state of not executing the normal process for turning the turning wheels 5 according to the driver's steering operation. Therefore, during the period of the start-up state, the turning wheels 5 maintain a state at the time of start-up of the power source.

Figure 3:
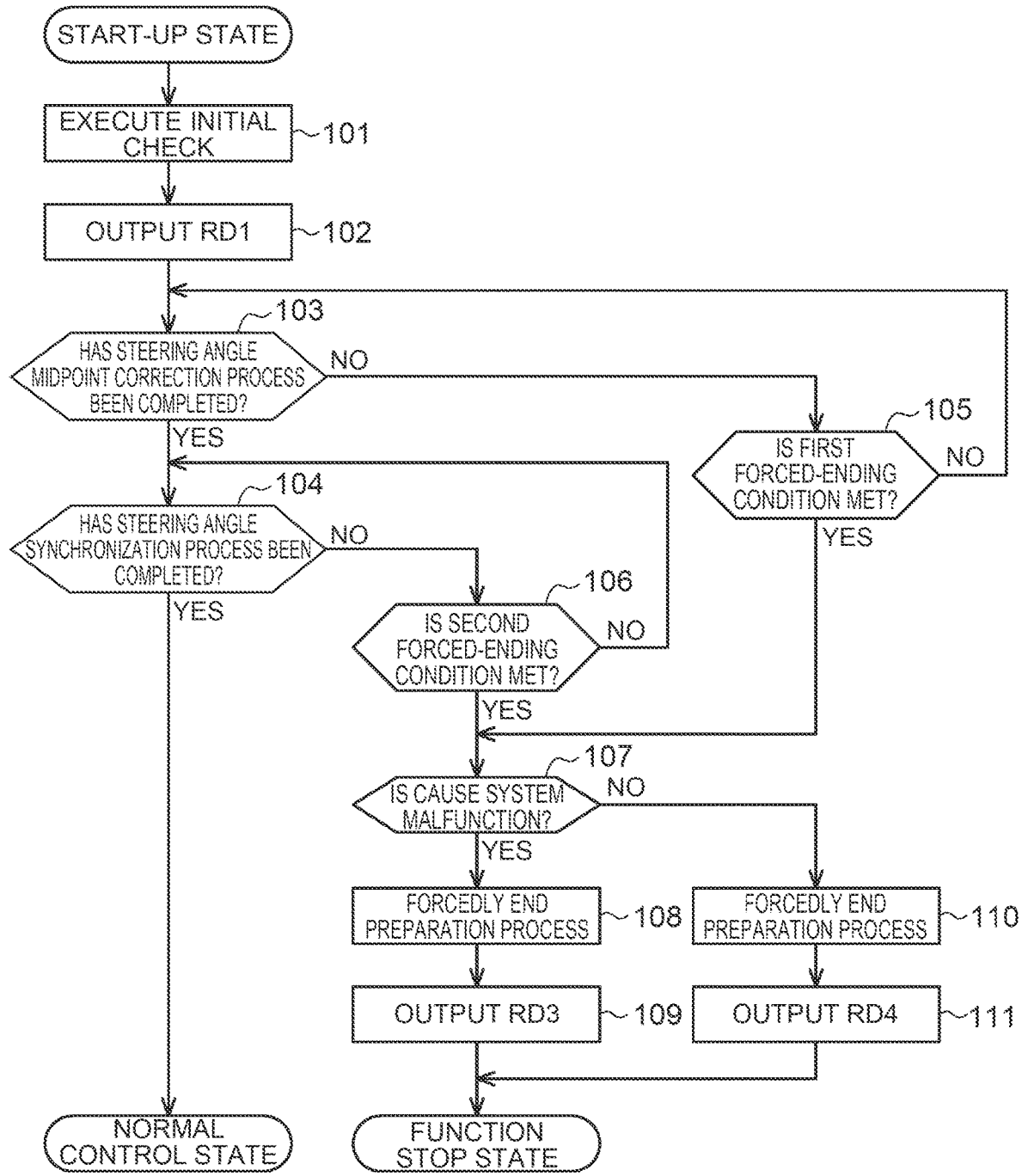
FIG. 3 is a flowchart showing the procedure of a process that the steering control unit of FIG. 1 executes in a start-up state.

Next, one example of the processing procedure of the steering angle correction process that the CPU 49a executes in the start-up state will be described in accordance with the flowchart shown in FIG. 3. As shown in FIG. 3, after the start signal Sig is input, the CPU 49a executes an initial check (step 101). In step 101, the CPU 49a executes a process that is an initial inspection associated with start-up of the power source, the process involving a hardware check and retrieving various pieces of information stored in the memory 49b. The various pieces of information include the steering-side midpoint information θns stored in the storage 51a and the turning-side midpoint information θnt stored in the storage 61a.

Next, the CPU 49a outputs a steering state signal RD1 (step 102). At the timing of step 102, the CPU 49a starts the steering angle midpoint correction process and thereby starts the preparation process. In step 102, the CPU 49a outputs the steering state signal RD1 to the on-board network 8 during execution of the preparation process. The steering state signal RD1 is information indicating that the preparation process is being executed. During execution of the preparation process, the CPU 49a continuously outputs the steering state signal RD1 until the preparation process being executed is completed. The steering state signal RD1 output in step 102 is input into the vehicle control unit 7. When the steering state signal RD1 is input, the CPU 7a of the vehicle control unit 7 controls the operation of the notification device 9 so as to make a notification with a notification content H1 for system start-up. The notification content H1 for system start-up is a content indicating that the preparation process is being executed. While the steering state signal RD1 is input, the CPU 7a determines that the preparation process is being executed, i.e., the steering control unit 1 is in the start-up state. In this case, the CPU 7a is in a state of waiting for starting travel of the vehicle. In this embodiment, the steering state signal RD1 is a signal that specifies the notification content H1 for system start-up. Thus, the process of step 102 is one example of the notification content specification process that is one process of the notification process. The process executed by the CPU 7a that controls the operation of the notification device 9 so as to make a notification with the notification content H1 specified by the steering state signal RD1 is one example of the notification control process that is the remaining process of the notification process.

Next, the CPU 49a determines whether the steering angle midpoint correction process has been completed (step 103). In step 103, when it can be determined that each of the steering-side process and the turning-side process has been completed, the CPU 49a determines that the steering angle midpoint correction process has been completed. As the steering-side process, the CPU 49a calculates the set steering angle θs0 and, as necessary, writes the steering-side midpoint information θns into the storage 51a. As the turning-side process, the CPU 49a calculates the set pinion angle θp0 and, as necessary, writes the turning-side midpoint information θnt into the storage 61a.

Next, when the CPU 49a determines that the steering angle midpoint correction process has been completed (step 103: YES), the CPU 49a determines whether the steering angle synchronization process has been completed (step 104). At the timing of step 104, the CPU 49a starts the steering angle synchronization process. In step 104, when it can be determined that each of the steering-side process and the turning-side process has been completed, the CPU 49a determines that the steering angle synchronization process has been completed. As the turning-side process, the CPU 49a calculates the set pinion angle θp0. As the steering-side process, the CPU 49a changes the set steering angle θs0 and thereby synchronizes the steering angle θs and the pinion angle θp such that the positional relationship therebetween meets a predetermined correspondence relationship.

Next, when the CPU 49a determines that the steering angle synchronization process has been completed (step 104: YES), the CPU 49a sets completion of the preparation process to be executed in the start-up state, and makes a state transition to the normal control state where the normal process is executed. In this case, the CPU 49a stops outputting the steering state signal RD1, and outputs a preparation process completion signal RF to the on-board network 8. The preparation process completion signal RF output here is input into the vehicle control unit 7. When the preparation process completion signal RF is input, the CPU 7a of the vehicle control unit 7 determines that the preparation process has been completed, i.e., the steering device 2 has made a state transition to the normal control state. In this case, the CPU 7a controls the operation of the notification device 9 so as to end the notification with the notification content H1 for system start-up. Then, the CPU 7a makes a state transition to a state where travel of the vehicle can be started.

When the CPU 49a determines in step 103 that the steering angle midpoint correction process is being executed and has not yet been completed (step 103: NO), the CPU 49a determines whether a first forced-ending condition is met (step 105). In step 105, the CPU 49a determines whether an elapsed time Ta that is a time that has elapsed since the steering angle midpoint correction process has been started is longer than a threshold time Tath. In this case, when the elapsed time Ta is longer than the threshold time Tath, the CPU 49a determines that the first forced-ending condition is met. When the elapsed time Ta is equal to or shorter than the threshold time Tath, the CPU 49a determines that the first forced-ending condition is not met. The process of step 105 is a process for determining, when the steering angle midpoint correction process is being prolonged, whether to forcedly end the steering angle midpoint correction process that is being executed and has not yet been completed. In this embodiment, the threshold time Tath is set to a value within a range experimentally obtained as a time that is sufficiently, for example, about several times longer than a time expected to be required for the steering angle midpoint correction process. In this embodiment, that the elapsed time Ta is longer than the threshold time Tath is one example of the forced-ending condition. The process of step 105 is one example of the forced-ending condition determination process.

Next, when the CPU 49a determines that the first forced-ending condition is not met (step 105: NO), the CPU 49a continuously executes the process of step 103, i.e., the steering angle midpoint correction process. On the other hand, when the CPU 49a determines that the first forced-ending condition is met (step 105: YES), the CPU 49a executes the process of step 107.

When the CPU 49a determines in step 104 that the steering angle synchronization process is being executed and has not yet been completed (step 104: NO), the CPU 49a determines whether a second forced-ending condition is met (step 106). In step 106, the CPU 49a determines whether an elapsed time Tb that is a time that has elapsed since the steering angle synchronization process has been started is longer than a threshold time Tbth. In this case, when the elapsed time Tb is longer than the threshold time Tbth, the CPU 49a determines that the second forced-ending condition is met. When the elapsed time Tb is equal to or shorter than the threshold time Tbth, the CPU 49a determines that the second forced-ending condition is not met. The process of step 106 is a process for determining, when the steering angle synchronization process is being prolonged, whether to forcedly end the steering angle synchronization process that is being executed and has not yet been completed. In this embodiment, the threshold time Tbth is set to a value within a range experimentally obtained as a time that is sufficiently, for example, about several times longer than a time expected to be required for the steering angle synchronization process. The threshold time Tbth has a different value from the threshold time Tath. In this embodiment, that the elapsed time Tb is longer than the threshold time Tbth is one example of the forced-ending condition. The process of step 106 is one example of the forced-ending condition determination process.

Next, when the CPU 49a determines that the second forced-ending condition is not met (step 106: NO), the CPU 49a continuously executes the process of step 104, i.e., the steering angle synchronization process. On the other hand, when the second forced-ending condition is met (step 106: YES), the CPU 49a executes the process of step 107.

Next, when the result of step 105 is YES or the result of step 106 is YES, the CPU 49a determines whether the cause is system malfunction (step 107). In step 107, the CPU 49a determines the cause for the YES determination in step 105 or the YES determination step 106. In this case, the CPU 49a determines whether it has output a steering state signal RD2, to be described later, during execution of the steering angle midpoint correction process or the steering angle synchronization process. The steering state signal RD2 is information indicating whether there has been intervention by the driver, such as touching the steering wheel 3, during execution of the steering angle midpoint correction process or the steering angle synchronization process. When the CPU 49a has not output the steering state signal RD2, the CPU 49a determines that system malfunction is the cause. When the CPU 49a has output the steering state signal RD2, the CPU 49a determines that the cause is not system malfunction, i.e., the cause is intervention by the driver. In this embodiment, the process of step 107 is one example of the cause-for-ending determination process.

Causes for prolongation of the steering angle midpoint correction process are roughly divided into two cases: a case where malfunction of a system, such as hardware, is the cause, and a case where intervention by the driver, such as touching the steering wheel 3, is the cause. For example, in the case where system malfunction is the cause, the steering angle midpoint correction process cannot be advanced due to the hardware etc. failing to operate normally. As a result, the elapsed time Ta exceeds the threshold time Tath and time runs out. In the case where intervention by the driver is the cause, the steering angle midpoint correction process is hindered from progressing and interrupted as the driver, for example, touches the steering wheel 3. As a result, the elapsed time Ta exceeds the threshold time Tath and time runs out. The same applies to causes for prolongation of the steering synchronization process. For example, in the case where system malfunction is the cause, the steering angle synchronization process cannot be advanced due to the hardware etc. failing to operate normally. As a result, the elapsed time Tb exceeds the threshold time Tbth and time runs out. In the case where intervention by the driver is the cause, the steering angle synchronization process is hindered from progressing and interrupted as the driver, for example, touches the steering wheel 3. As a result, the elapsed time Tb exceeds the threshold time Tbth and time runs out.

When the CPU 49a determines in step 107 that system malfunction is the cause (step 107: YES), the CPU 49a forcedly ends the preparation process being executed (step 108). In step 108, when the steering angle midpoint correction process is being executed, the CPU 49a forcedly ends the steering angle midpoint correction process being executed. When the steering angle synchronization process is being executed, the CPU 49a forcedly ends the steering angle synchronization process being executed. In this embodiment, the process of step 108 is one example of the forced-ending process.

Next, the CPU 49a outputs a steering state signal RD3 (step 109). In step 109, the CPU 49a stops outputting the steering state signal RD1, and outputs the steering state signal RD3 to the on-board network 8. The steering state signal RD3 is information indicating that the preparation process has been forcedly ended due to system malfunction.

In this case, the CPU 49a determines that the preparation process cannot be completed, and makes a state transition to a function stop state where, for example, the functions of the steering control unit 1 are stopped. The steering state signal RD3 output in step 109 is input into the vehicle control unit 7. When the steering state signal RD3 is input, the CPU 7a of the vehicle control unit 7 controls the operation of the notification device 9 so as to make a notification with a notification content H3 for system malfunction. The notification content H3 for system malfunction is a content indicating that the preparation process has been forcedly ended due to system malfunction. Further, when the steering state signal RD3 is input, the CPU 7a determines that the preparation process has been forcedly ended, i.e., the steering control unit 1 cannot make a state transition to the normal control state. In this case, the CPU 7a determines that travel of the vehicle cannot be started, and makes a state transition to a failure state where, for example, the travel function of the vehicle is stopped.

In this embodiment, the steering state signal RD3 is a signal specifying the notification content H3 for system malfunction. Thus, the process of step 109 is one example of the notification content specification process that is one process of the notification process. The process executed by the CPU 7a that controls the operation of the notification device 9 so as to make a notification with the notification content H3 specified by the steering state signal RD3 is one example of the notification control process that is the remaining process of the notification process.

On the other hand, when the CPU 49a determines in step 107 that intervention by the driver is the cause (step 107: NO), the CPU 49a forcedly ends the preparation process being executed (step 110). In step 110, when the steering angle midpoint correction process is being executed, the CPU 49a forcedly ends the steering angle midpoint correction process being executed. When the steering angle synchronization process is being executed, the CPU 49a forcedly ends the steering angle synchronization process being executed. In this embodiment, the process of step 110 is one example of the forced-ending process.

Next, the CPU 49a outputs a steering state signal RD4 (step 111). In step 111, the CPU 49a stops outputting the steering state signal RD1, and outputs the steering state signal RD4 to the on-board network 8. The steering state signal RD4 is information indicating that the preparation process has been forcedly ended due to intervention by the driver. In this case, the CPU 49a determines that the preparation process cannot be completed, and makes a state transition to the function stop state where, for example, the functions of the steering control unit 1 are stopped. The steering state signal RD4 output in step 111 is input into the vehicle control unit 7. When the steering state signal RD4 is input, the CPU 7a of the vehicle control unit 7 controls the operation of the notification device 9 so as to make a notification with a notification content H4 for power source restart-up. The notification content H4 for power source restart-up is a content indicating that the preparation process has been forcedly ended due to intervention by the driver. Further, when the steering state signal RD4 is input, the CPU 7a determines that the preparation process has been forcedly ended, i.e., the steering control unit 1 cannot make a state transition to the normal control state. In this case, the CPU 7a determines that travel of the vehicle can be started if the vehicle is restarted and the preparation process is executed over again, and makes a state transition to a failure state where, for example, restart-up of the vehicle is waited for. In this embodiment, the steering state signal RD4 is a signal that specifies the notification content H4 for power source restart-up. Thus, the process of step 111 is one example of the notification content specification process that is one process of the notification process. The process executed by the CPU 7a that controls the operation of the notification device 9 so as to make a notification with the notification content H4 specified by the steering state signal RD4 is one example of the notification control process that is the remaining process of the notification process.

Steering Angle Midpoint Correction Process

Next, one example of the processing procedure of the steering-side process in the steering angle midpoint correction process that the CPU 49a executes through the steering-side preparation processor 53 will be described in accordance with the flowchart shown in FIG. 4.

Figure 4:
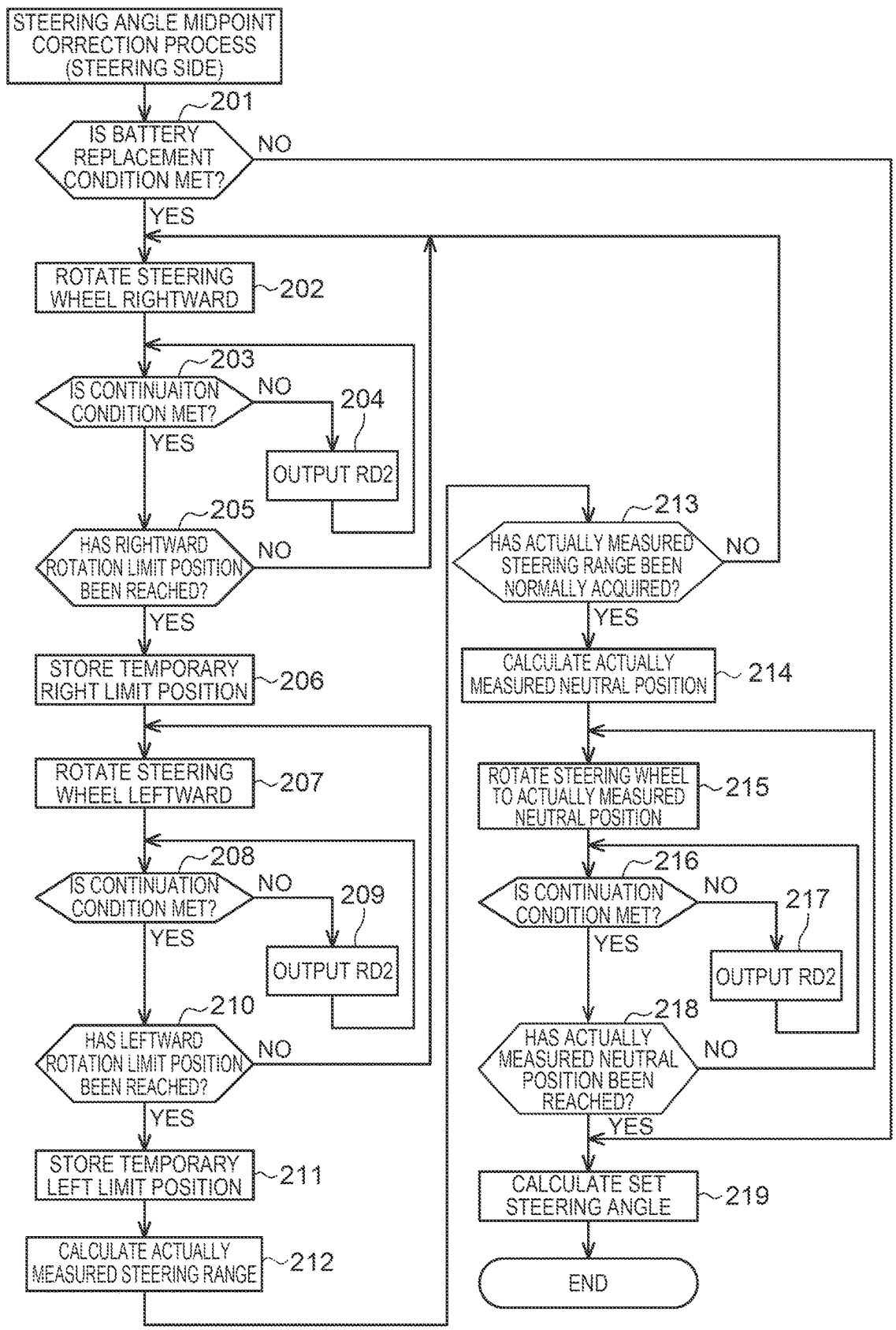
FIG. 4 is a flowchart showing the procedure of a steering-side process of a steering angle midpoint correction process of FIG. 3.

As shown in FIG. 4, the CPU 49a determines whether the battery replacement condition is met (step 201). In step 201, when the battery replacement information FLG is input, the CPU 49a determines that the power source has been started for the first time since battery replacement. On the other hand, when the battery replacement information FLG is not input, the CPU 49a determines that the power source has been started not for the first time since battery replacement. In this embodiment, that the power source has been started for the first time since battery replacement is one example of the battery replacement condition.

For the contents of the memory 49b, rewritable contents are cleared and initialized in association with battery replacement. For example, contents stored in the storage 51a correspond to rewritable contents and are cleared and initialized in association with battery replacement. Thus, in step 201, by determining that the power source has been started for the first time since battery replacement, the CPU 49a determines that the contents stored in the storage 51a have been cleared and initialized. On the other hand, by determining that the power source has been started not for the first time since battery replacement, the CPU 49a determines that the contents stored in the storage 51a have not been cleared and initialized.

Next, when the CPU 49a determines that the battery replacement condition is met (step 201: YES), the CPU 49a rotates the steering wheel 3 rightward that is one of leftward and rightward directions (step 202). In step 202, the CPU 49a calculates the target rotation torque RT* for automatically rotating the steering wheel 3 rightward. For example, the CPU 49a calculates the target rotation torque RT* through feedback control of a temporary steering angle $\theta$si such that the temporary steering angle $\theta$si adapts to the steering target angle $\theta$s*. The temporary steering angle $\theta$si is an integrated angle that is obtained using the position of the rotation angle $\theta$a at the start-up of the power source as a temporary reference value. The steering target angle $\theta$s* is a value that is updated so as to change gradually beyond the rightward rotation limit position 3a from the value of the temporary steering angle $\theta$si at the start of the steering-side process in the rotation range of the steering wheel 3.

Next, the CPU 49a determines whether a continuation condition is met (step 203). In step 203, the CPU 49a determines whether the steering torque Th is equal to or smaller than a torque threshold value Thth. In this case, when the steering torque Th is equal to or smaller than the torque threshold value Thth, the CPU 49a determines that the continuation condition is met. When the steering torque Th is larger than the torque threshold value Thth, the CPU 49a determines that the continuation condition is not met. The process of step 203 is a process for determining whether there is intervention by the driver during execution of the steering-side process. In this embodiment, the torque threshold value Thth is set to a value within a range experimentally obtained as such a value that rotation of the steering wheel 3 is hindered as the driver, for example, touches the steering wheel 3.

Next, when the CPU 49a determines that the continuation condition is not met (step 203: NO), the CPU 49a outputs the steering state signal RD2 (step 204) and repeatedly executes the process of step 203. In step 204, the CPU 49a outputs the steering state signal RD2 to the on-board network 8. The steering state signal RD2 is information indicating that there is intervention by the driver during execution of the steering angle midpoint correction process. In this case, the CPU 49a is in a state where it determines that the steering-side process cannot be continued and suspends the steering-side process being executed. In the case of repeating the processes of step 203 and step 204, the CPU 49a continuously suspends the steering angle midpoint correction process, i.e., the steering-side process. In this case, the CPU 49a continuously outputs the steering state signal RD2. The steering state signal RD2 output in step 204 is input into the vehicle control unit 7. When the steering state signal RD2 is input, the CPU 7a of the vehicle control unit 7 controls the operation of the notification device 9 so as to make a notification with a notification content H2 for alarming. The notification content H2 for alarming is a content that prompts elimination of intervention by the driver. In this embodiment, the steering state signal RD2 is a signal specifying the notification content H2 for alarming. Thus, the process of step 204 is one example of the notification content specification process that is one process of the notification process. The process executed by the CPU 7a that controls the operation of the notification device 9 so as to make a notification with the notification content H2 specified by the steering state signal RD2 is one example of the notification control process that is the remaining process of the notification process.

On the other hand, when the CPU 49a determines that the continuation condition is met (step 203: YES), the CPU 49a determines whether the steering wheel 3 has reached the rightward rotation limit position 3a (step 205). In step 205, for example, the CPU 49a monitors the steering-side actual current value Ia. The steering-side actual current value Ia does not undergo a significant change until the steering wheel 3 reaches the rightward rotation limit position 3a. The absolute value of the steering-side actual current value Ia increases sharply when the steering wheel 3 reaches the rightward rotation limit position 3a. This is because rotation of the steering-side motor 13 is restricted as automatic rotation of the steering shaft 11 is restricted through the stopper mechanism 11b. In this case, the target rotation torque RT* increases sharply and also the steering-side actual current value Ia increases sharply as the CPU 49a tries to further rotate the steering-side motor 13 while rotation of the steering-side motor 13 is restricted. When the absolute value of the steering-side actual current value Ia is equal to or larger than a current threshold value Iath, the CPU 49a determines that the steering wheel 3 has reached the rightward rotation limit position 3a. On the other hand, when the absolute value of the steering-side actual current value Ia is smaller than the current threshold value Iath, the CPU 49a determines that the steering wheel 3 has not reached the rightward rotation limit position 3a. For example, the current threshold value Iath is set to a value within a range experimentally obtained as such a value that rotation of the steering-side motor 13 is restricted as rotation of the steering shaft 11 is restricted through the stopper mechanism 11b.

Next, when the CPU 49a determines that the steering wheel 3 has not reached the rightward rotation limit position 3a (step 205: NO), the CPU 49a repeatedly executes the processes of step 202 to step 205. On the other hand, when the CPU 49a determines that the steering wheel 3 has reached the rightward rotation limit position 3a (step 205: YES), the CPU 49a temporarily stores a temporary right limit position $\theta rl$ (step 206). In step 206, the CPU 49a temporarily stores, as the temporary right limit position $\theta rl$, the temporary steering angle $\theta si$ of the time when it has been determined that the rightward rotation limit position 3a has been reached.

Next, the CPU 49a rotates the steering wheel 3 leftward that is the other direction than the rightward direction (step 207). In step 207, the CPU 49a calculates the target rotation torque RT* for automatically rotating the steering wheel 3 leftward. For example, as in the process of step 202, the CPU 49a calculates the target rotation torque RT* through feedback control of the temporary steering angle $\theta si$ such that the temporary steering angle $\theta si$ adapts to the steering target angle $\theta s*$. The steering target angle $\theta s*$ is a value that is updated so as to change gradually beyond the leftward rotation limit position 3b from the value of the temporary steering angle $\theta si$ of the case where the rightward rotation limit position 3a has been reached in the rotation range of the steering wheel 3.

Next, the CPU 49a determines whether a continuation condition is met (step 208). In step 208, as in the process of step 203, the CPU 49a determines whether the steering torque Th is equal to or smaller than the torque threshold value Thth. When the CPU 49a determines that the continuation condition is not met (step 208: NO), the CPU 49a outputs the steering state signal RD2 (step 209) and repeatedly executes the process of step 208. In step 209, as in step 204, the CPU 49a outputs, to the on-board network 8, the steering state signal RD2 indicating that there is intervention by the driver during execution of the steering angle midpoint correction process. In the case of repeating the processes of step 208 and step 209, the CPU 49a continuously suspends the steering angle midpoint correction process, i.e., the steering-side process. In this case, the CPU 49a continuously outputs the steering state signal RD2. Thus, the process of step 209 is one example of the notification content specification process that is one process of the notification process.

On the other hand, when the CPU 49a determines that the continuation condition is met (step 208: YES), the CPU 49a determines whether the steering wheel 3 has reached the leftward rotation limit position 3b (step 210). In step 210, for example, the CPU 49a monitors the steering-side actual current value Ia as in step 205.

Next, when the CPU 49a determines that the steering wheel 3 has not reached the leftward rotation limit position 3b (step 210: NO), the CPU 49a repeatedly executes the processes of step 207 to step 210. On the other hand, when the CPU 49a determines that the steering wheel 3 has reached the leftward rotation limit position 3b (step 210: YES), the CPU 49a temporarily stores the temporary left limit position $\theta ll$ (step 211).

In step 211, the CPU 49a temporarily stores, as the temporary left limit position $\theta ll$, the temporary steering angle $\theta si$ of the time when it has been determined that the leftward rotation limit position 3b has been reached.

Next, the CPU 49a calculates an actually measured steering range SR that is the steering range of the steering wheel 3 (step 212). In step 212, the CPU 49a calculates, as the actually measured steering range SR, the absolute value of the difference between the temporary right limit position $\theta rl$ temporarily stored in step 206 and the temporary left limit position $\theta ll$ temporarily stored in step 211.

Next, the CPU 49a determines whether the actually measured steering range SR has been normally acquired (step 213). In step 213, the CPU 49a determines whether the absolute value of the difference between the actually measured steering range SR calculated in step 212 and a design value SR0 is smaller than a steering range threshold value SRth. For example, if the driver hinders rotation of the steering wheel 3 by touching it etc. during execution of the process of step 202 or step 207, a normal value may fail to be stored as the temporary right limit position $\theta rl$ or the temporary left limit position $\theta ll$. In this case, the actually measured steering range SR may fail to be normally acquired. When the absolute value of the difference between the actually measured steering range SR and the design value SR0 is equal to or larger than the steering range threshold value SRth, the CPU 49a determines that the actually measured steering range SR has failed to be normally acquired. On the other hand, when the absolute value of the difference between the actually measured steering range SR and the design value SR0 is smaller than the steering range threshold value SRth, the CPU 49a determines that the actually measured steering range SR has been normally acquired. For example, the design value SR0 is set as a value defining the steering range of the steering wheel 3, individually for each vehicle in which the steering device 2 is installed. The steering range threshold value SRth is set to a value within a range obtained with a tolerance factored in, as such a value that it can be determined that there is no deviation from the design value SR0 of the steering range of the steering wheel 3.

Next, when the CPU 49a determines that the actually measured steering range SR has failed to be normally acquired (step 213: NO), the CPU 49a repeatedly executes the processes of steps 202 to 213.

On the other hand, when the CPU 49a determines that the actually measured steering range SR has been normally acquired (step 213: YES), the CPU 49a calculates an actually measured neutral position (step 214). In step 214, the CPU 49a calculates, as the actually measured neutral position, a value corresponding to a midpoint between the temporary right limit position $\theta rl$ temporarily stored in step 206 and the temporary left limit position $\theta ll$ temporarily stored in step 211. The absolute value of the difference between the actually measured neutral position and the temporary right limit position $\theta rl$ and the absolute value of the difference between the actually measured neutral position and the temporary left limit position $\theta ll$ are equal to each other.

Next, the CPU 49a rotates the steering wheel 3 to the actually measured neutral position (step 215). In step 215, the CPU 49a calculates the target rotation torque RT* for automatically rotating the steering wheel 3 to the actually measured neutral position calculated in step 214. For example, the CPU 49a calculates the target rotation torque RT* through feedback control of the temporary steering angle θsi such that the temporary steering angle θsi adapts to the steering target angle θs*. The steering target angle θs* is a value that is updated so as to change gradually to a value indicating the actually measured neutral position from the value of the temporary steering angle θsi of the case where the leftward rotation limit position 3b has been reached in the rotation range of the steering wheel 3.

Next, the CPU 49a determines whether a continuation condition is met (step 216). In step 216, as in the process of step 203, the CPU 49a determines whether the steering torque Th is equal to or smaller than the torque threshold value Thth. When the CPU 49a determines that the continuation condition is not met (step 216: NO), the CPU 49a outputs the steering state signal RD2 (step 217) and repeatedly executes the process of step 216. In step 217, as in step 204, the CPU 49a outputs, to the on-board network 8, the steering state signal RD2 indicating that there is intervention by the driver during execution of the steering angle midpoint correction process. In the case of repeating the processes of step 216 and step 217, the CPU 49a continuously suspends the steering angle midpoint correction process, i.e., the steering-side process. In this case, the CPU 49a continuously outputs the steering state signal RD2. Thus, the process of step 217 is one example of the notification content specification process that is one process of the notification process.

On the other hand, when the CPU 49a determines that the continuation condition is met (step 216: YES), the CPU 49a determines whether the steering wheel 3 has reached the actually measured neutral position (step 218). In step 218, for example, the CPU 49a monitors the temporary steering angle θsi. When the temporary steering angle θsi matches the actually measured neutral position, the CPU 49a determines that the steering wheel 3 has reached the actually measured neutral position. On the other hand, when the temporary steering angle θsi does not match the actually measured neutral position, the CPU 49a determines that the steering wheel 3 has not reached the actually measured neutral position.

Next, when the CPU 49a determines that the steering wheel 3 has not reached the actually measured neutral position (step 218: NO), the CPU 49a repeatedly executes the processes of step 215 to step 218. On the other hand, when the CPU 49a determines that the steering wheel 3 has reached the actually measured neutral position (step 218: YES), the CPU 49a calculates the set steering angle θs0 (step 219) and sets completion of the steering-side process. At the timing of step 219, the CPU 49a writes the actually measured neutral position into the storage 51a. In this case, the CPU 49a writes, as the steering-side midpoint information θns, the temporary steering angle θsi corresponding to the actually measured neutral position calculated in step 214 into the storage 51a. In step 219, the CPU 49a calculates the set steering angle θs0 that is obtained by correcting the rotation angle θa based on the steering-side midpoint information θns having been written into the storage 51a. The set steering angle θs0 is an absolute angle relative to the steering neutral position, and is used as the steering angle θs to be used when executing the normal process.

When the CPU 49a determines in step 201 that the battery replacement condition is not met (step 201: NO), the CPU 49a calculates the set steering angle θs0 (step 219) and sets completion of the steering-side process. In step 219 in this case, the CPU 49a calculates the set steering angle θs0 that is obtained by correcting the rotation angle θa based on the steering-side midpoint information θns among the pieces of information retrieved from the storage 51a in the process of step 101. When the determination result of step 201 is NO, the CPU 49a does not execute the processes of step 202 to step 218.

Next, one example of the processing procedure of the turning-side process in the steering angle midpoint correction process that the CPU 49a executes through the turning-side preparation processor 63 will be described in accordance with the flowchart shown in FIG. 5. In this embodiment, the CPU 49a does not operate the turning unit 6 in association with execution of the turning-side process. Therefore, the turning wheels 5 are not turned during execution of the turning-side process.

Figure 5:
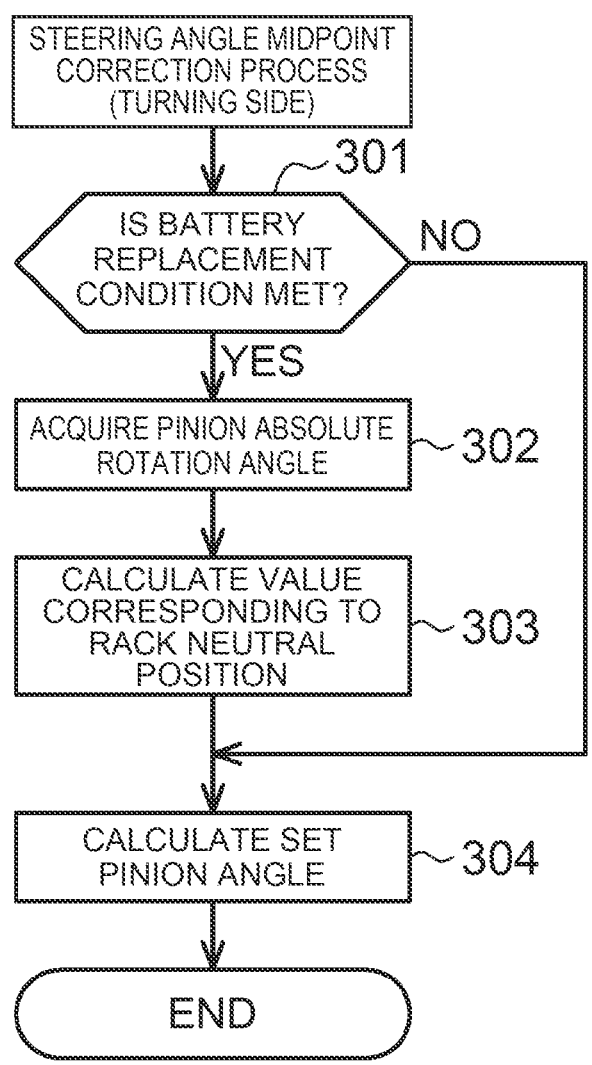
FIG. 5 is a flowchart showing the procedure of a turning-side process of the steering angle midpoint correction process of FIG. 3.

As shown in FIG. 5, the CPU 49a determines whether the battery replacement condition is met (step 301). In step 301, as in step 201, the CPU 49a determines whether the battery replacement condition is met based on whether the battery replacement information FLG is input.

Next, when the CPU 49a determines that the battery replacement condition is met (step 301: YES), the CPU 49a acquires the pinion absolute rotation angle θabp (step 302), and calculates a value corresponding to the rack neutral position (step 303). In step 303, the CPU 49a calculates the number of revolutions corresponding to the pinion absolute rotation angle θabp. Further, the CPU 49a calculates a value corresponding to the rack neutral position for the pinion angle θp that is obtained by correcting the rotation angle θb based on the number of revolutions.

Next, the CPU 49a calculates the set pinion angle θp0 (step 304) and sets completion of the turning-side process. At the timing of step 304, the CPU 49a writes the rack neutral position into the storage 61a. In this case, the CPU 49a writes, as the turning-side midpoint information θnt, the value corresponding to the rack neutral position calculated in step 303 into the storage 61a. In step 304, the CPU 49a calculates the set pinion angle θp0 obtained by correcting the rotation angle θb based on the turning-side midpoint information θnt having been written into the storage 61a. The set pinion angle θp0 is an absolute angle relative to the rack neutral position, and is used as the pinion angle θp to be used when executing the normal process.

When the CPU 49a determines in step 301 that the battery replacement condition is not met (step 301: NO), the CPU 49a calculates the set pinion angle θp0 (step 304) and sets completion of the turning-side process. In step 304 in this case, the CPU 49a calculates the set pinion angle θp0 that is obtained by correcting the rotation angle θb based on the turning-side midpoint information θnt among the pieces of information having been retrieved from the storage 61a in the process of step 101. When the determination result of step 301 is NO, the CPU 49a does not execute the processes of step 302 and step 303.

Thus, after the process of step 219 of the steering-side process and the process of step 304 of the turning-side process, the CPU 49a can determine that the steering angle midpoint correction process has been completed (step 103: YES).

Motion of Steering Wheel Involved in Steering Angle Midpoint Correction Process

FIG. 6A illustrates a case where the initial position of the steering wheel 3 at the start of execution of the steering angle midpoint correction process is the steering neutral position ("0" in FIG. 6A).

For example, as shown in FIG. 6A, when execution of the steering angle midpoint correction process is started, the steering wheel 3 starts rotating rightward automatically. In this case, as shown in FIG. 6G, during the period up to time t1, the temporary steering angle θsi changes gradually from "0" toward the positive value side ("θsi (+)" in FIG. 6G) following the steering target angle θs* represented by the long dashed short dashed line in FIG. 6G that is updated beyond the rightward rotation limit position 3a. In FIG. 6G, the solid line shows changes in the temporary steering angle θsi, and the long dashed short dashed line shows changes in the steering target angle θs*.

Next, as shown in FIG. 6B, when the steering wheel 3 reaches the rightward rotation limit position 3a, the rotation stops automatically. In this case, as shown in FIG. 6G, when time t1 is reached, the temporary steering angle θsi assumes a value corresponding to the rightward rotation limit position 3a and does not change after that. The steering target angle θs* continues to change also after the temporary steering angle θsi has stopped changing. Thereafter, as shown in FIG. 6G, when time t2 at which the absolute value of the steering-side actual current value Ia becomes equal to or larger than the current threshold value Iath is reached, a first value θsi1 that is the value of the temporary steering angle θsi at that time is temporarily stored as the temporary right limit position θrl.

Next, as shown in FIG. 6C, the steering wheel 3 starts rotating leftward automatically. In this case, as shown in FIG. 6G, during the period up to time t3, the temporary steering angle θsi changes gradually from "0" toward the negative value side ("θsi (−)" in FIG. 6G) following the steering target angle θs* that is updated beyond the leftward rotation limit position 3b.

Next, as shown in FIG. 6D, when the steering wheel 3 reaches the leftward rotation limit position 3b, the rotation stops automatically. In this case, as shown in FIG. 6G, when time t3 is reached, the temporary steering angle θsi assumes a value corresponding to the leftward rotation limit position 3b and does not change after that. The steering target angle θs* continues to change also after the temporary steering angle θsi has stopped changing. Thereafter, as shown in FIG. 6G, when time t4 at which the absolute value of the steering-side actual current value Ia becomes equal to or larger than the current threshold value Iath is reached, a second value θsi2 that is the value of the temporary steering angle θsi at that time is temporarily stored as the temporary left limit position θll.

Next, as shown in FIG. 6E, the steering wheel 3 starts rotating automatically to the actually measured neutral position ("0" in FIG. 6E). In this case, as shown in FIG. 6G, during the period up to time t5, the temporary steering angle θsi increases gradually from the second value θsi2 toward "0" following the steering target angle θs* that is updated as the value indicating the actually measured neutral position.

Next, as shown in FIG. 6F, when the steering wheel 3 reaches the actually measured neutral position, the rotation stops automatically. In this case, as shown in FIG. 6G, when time t5 is reached, the temporary steering angle θsi assumes a value corresponding to the actually measured neutral position and does not change after that. The steering target angle θs* has already stopped changing before the temporary steering angle θsi assumes a value corresponding to the actually measured neutral position. Thereafter, the set steering angle θs0 is calculated and the value corresponding to the actually measured neutral position is written into the storage 51a as the steering-side midpoint information θns, and thereby the steering angle midpoint correction process is ended.

Steering Angle Synchronization Process

Next, one example of the processing procedure of the steering-side process in the steering angle synchronization process that the CPU 49a executes through the steering-side preparation processor 53 will be described in accordance with the flowchart shown in FIG. 7.

Figure 7:
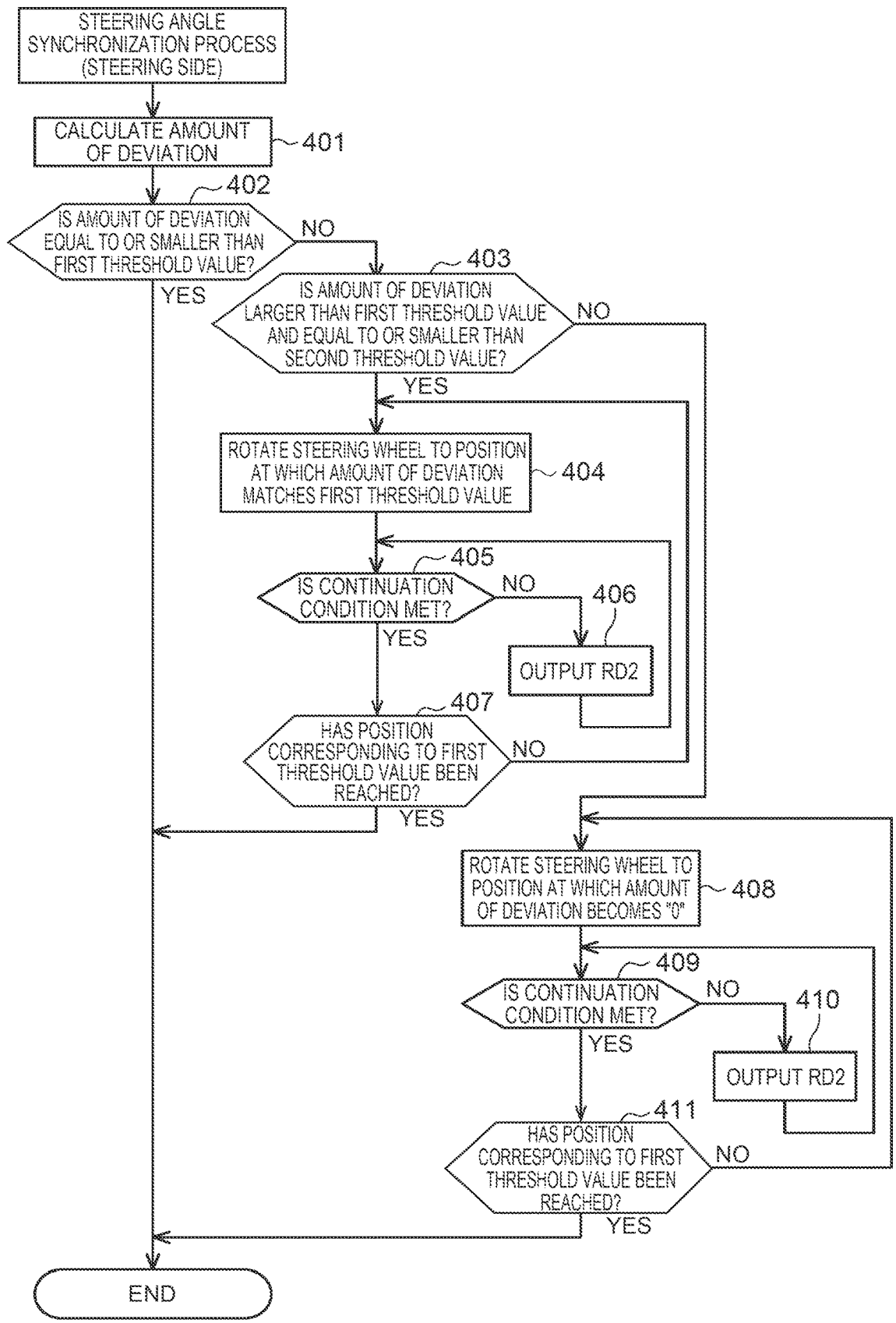
FIG. 7 is a flowchart showing the procedure of a steering angle synchronization process of FIG. 3.

As shown in FIG. 7, the CPU 49a calculates an amount of deviation Δθ (step 401). In step 401, for example, the CPU 49a calculates, as the amount of deviation Δθ, the absolute value of the difference between the set steering angle θs0 upon completion of the steering angle midpoint correction process and the set pinion angle θp0. In this case, the set pinion angle θp0 has a value converted into the scale of the set steering angle θs0 taking into account a steering angle ratio that is a ratio between the steering angle θs and the pinion angle θp.

Next, the CPU 49a determines whether the amount of deviation Δθ is equal to or smaller than a first threshold value θ1 (step 402). In this embodiment, the first threshold value θ1 is set to a value within a range experimentally obtained as such a value that, even when the vehicle starts traveling while having the amount of deviation Δθ, the behavior of the vehicle having started traveling is less likely to cause discomfort to the driver.

Next, when the CPU 49a determines that the amount of deviation Δθ is equal to or smaller than the first threshold value θ1 (step 402: YES), the CPU 49a sets completion of the steering-side process. On the other hand, when the CPU 49a determines that the amount of deviation Δθ is larger than the first threshold value θ1 (step 402: NO), the CPU 49a determines whether the amount of deviation Δθ is larger than the first threshold value θ1 and equal to or smaller than a second threshold value θ2 (step 403). The second threshold value θ2 is set to a value within a range experimentally obtained as such a value that, even when the steering wheel 3 is rotated so as to bring the amount of deviation Δθ closer to the zero value, this rotation of the steering wheel 3 is less likely to cause discomfort to the driver.

Next, when the CPU 49a determines that the amount of deviation Δθ is larger than the first threshold value θ1 and equal to or smaller than the second threshold value θ2 (step 403: YES), the CPU 49a rotates the steering wheel 3 to a position at which the amount of deviation Δθ matches the first threshold value θ1 (step 404). In step 404, the CPU 49a calculates the target rotation torque RT* for automatically rotating the steering wheel 3 to the position at which the amount of deviation Δθ matches the first threshold value θ1. For example, the CPU 49a calculates the target rotation torque RT* through feedback control of the set steering angle θs0 such that the set steering angle θs0 adapts to the steering target angle θs*. The steering target angle θs* is a value that is updated so as to change gradually from the value of the set steering angle θs0 to the position at which the amount of deviation Δθ matches the first threshold value θ1.

Next, the CPU 49a determines whether a continuation condition is met (step 405). In step 405, as in the process of step 203, the CPU 49a determines whether the steering torque Th is equal to or smaller than the torque threshold value Thth. When the CPU 49a determines that the continuation condition is not met (step 405: NO), the CPU 49a outputs the steering state signal RD2 (step 406) and repeatedly executes the process of step 405. In step 406, as in step 204, the CPU 49a outputs, to the on-board network 8, the steering state signal RD2 indicating that there is intervention by the driver during execution of the steering angle synchronization process. In the case of repeating the processes of step 405 and step 406, the CPU 49a continuously suspends the steering angle synchronization process, i.e., the steering-side process. In this case, the CPU 49a continuously outputs the steering state signal RD2. Thus, the process of step 406 is one example of the notification content specification process that is one process of the notification process.

On the other hand, when the CPU 49a determines that the continuation condition is met (step 405: YES), the CPU 49a determines whether the steering wheel 3 has reached the position at which the amount of deviation $\Delta\theta$ matches the first threshold value $\theta 1$ (step 407). In step 407, for example, the CPU 49a monitors the set steering angle $\theta s0$. When the set steering angle $\theta s0$ corresponds to the position at which the amount of deviation $\Delta\theta$ matches the first threshold value $\theta 1$, the CPU 49a determines that the steering wheel 3 has reached the position at which the amount of deviation $\Delta\theta$ matches the first threshold value $\theta 1$. On the other hand, when the set steering angle $\theta s0$ does not correspond to the position at which the amount of deviation $\Delta\theta$ matches the first threshold value $\theta 1$, the CPU 49a determines that the steering wheel 3 has not reached the position at which the amount of deviation $\Delta\theta$ matches the first threshold value $\theta 1$.

Next, when the CPU 49a determines that the steering wheel 3 has not reached the position at which the amount of deviation $\Delta\theta$ matches the first threshold value $\theta 1$ (step 407: NO), the CPU 49a repeatedly executes the processes of step 404 to step 407. On the other hand, when the CPU 49a determines that the steering wheel 3 has reached the position at which the amount of deviation $\Delta\theta$ matches the first threshold value $\theta 1$ (step 407: YES), the CPU 49a sets completion of the steering-side process.

When the CPU 49a determines in step 403 that the amount of deviation $\Delta\theta$ is larger than the second threshold value $\theta 2$ (step 403: NO), the CPU 49a rotates the steering wheel 3 to a position at which the amount of deviation $\Delta\theta$ becomes "0" (step 408). In step 408, the CPU 49a calculates the target rotation torque RT* for automatically rotating the steering wheel 3 to the position at which the amount of deviation $\Delta\theta$ becomes "0." For example, the CPU 49a calculates the target rotation torque RT* through feedback control of the set steering angle $\theta s0$ such that the set steering angle $\theta s0$ adapts to the steering target angle $\theta s*$. The steering target angle $\theta s*$ is a value that is updated so as to change gradually from the value of the set steering angle $\theta s0$ to the position at which the amount of deviation $\Delta\theta$ becomes "0."

Next, the CPU 49a determines whether a continuation condition is met (step 409). In step 409, as in the process of step 203, the CPU 49a determines whether the steering torque Th is equal to or smaller than the torque threshold value Thth. When the CPU 49a determines that the continuation condition is not met (step 409: NO), the CPU 49a outputs the steering state signal RD2 (step 410) and repeatedly executes the process of step 409. In step 409, as in step 204, the CPU 49a outputs, to the on-board network 8, the steering state signal RD2 indicating that there is intervention by the driver during execution of the steering angle synchronization process. In the case of repeating the processes of step 409 and step 410, the CPU 49a continuously suspends the steering angle synchronization process, i.e., the steering-side process. In this case, the CPU 49a continuously outputs the steering state signal RD2. Thus, the process of step 410 is one example of the notification content specification process that is one process of the notification process.

On the other hand, when the CPU 49a determines that the continuation condition is met (step 409: YES), the CPU 49a determines whether the steering wheel 3 has reached the position at which the amount of deviation $\Delta\theta$ becomes "0" (step 411). In step 411, for example, the CPU 49a monitors the set steering angle NO as in step 407. When the set steering angle NO corresponds to the position at which the amount of deviation $\Delta\theta$ becomes "0," the CPU 49a determines that the steering wheel 3 has reached the position at which the amount of deviation $\Delta\theta$ becomes "0." On the other hand, when the set steering angle NO does not correspond to the position at which the amount of deviation $\Delta\theta$ becomes "0," the CPU 49a determines that the steering wheel 3 has not reached the position at which the amount of deviation $\Delta\theta$ becomes "0."

Next, when the CPU 49a determines that the steering wheel 3 has not reached the position at which the amount of deviation $\Delta\theta$ becomes "0" (step 411: NO), the CPU 49a repeatedly executes the processes of step 408 to step 411. On the other hand, when the CPU 49a determines that the steering wheel 3 has reached the position at which the amount of deviation $\Delta\theta$ becomes "0" (step 411: YES), the CPU 49a sets completion of the steering-side process.

The turning-side process in the steering angle synchronization process that the CPU 49a executes through the turning-side preparation processor 63 does not include any special process except that a process of calculating the set pinion angle $\theta p0$ is included. In this embodiment, the CPU 49a does not operate the turning unit 6 in association with execution of the turning-side process. Therefore, the turning wheels 5 are not turned during execution of the turning-side process.

Thus, after the processes of step 402, step 407, and step 411 of the steering-side process of which the results are YES, the CPU 49a can determine that the steering angle synchronization process has been completed (step 104: YES).

In this embodiment, when an amount of deviation $\Delta\theta$ equal to or smaller than the first threshold value $\theta 1$ remains after completion of the steering angle synchronization process, for example, the CPU 49a executes a process of correcting the turning position of the turning wheels 5 such that this remaining amount of deviation $\Delta\theta$ becomes "0" after the vehicle starts traveling.

Motion of Steering Wheel Involved in Steering Angle Synchronization Process

Figure 8A:
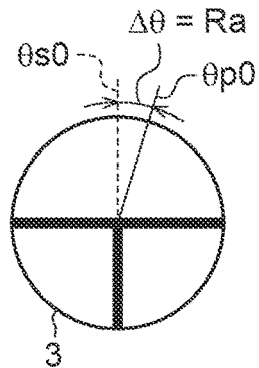
FIG. 8A is a view showing motion of the steering wheel during the steering angle synchronization process of FIG. 3.

FIG. 8A illustrates a case where the position of the turning wheels 5 at the start of execution of the steering angle synchronization process deviates from the rack neutral position toward the right side that is the positive value side (step 402: YES). For example, the amount of deviation $\Delta\theta$ upon completion of the steering angle midpoint correction process is an angle Ra having a value equal to or smaller than the first threshold value $\theta 1$. In this case, without rotating the steering wheel 3, the steering angle synchronization process is ended in a state of having the amount of deviation $\Delta\theta$ of the angle Ra.

Figure 8B:
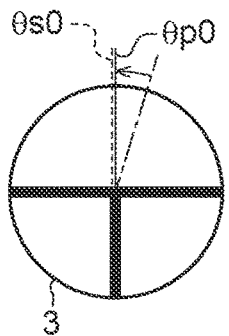
FIG. 8B is a view showing motion of the steering wheel during the steering angle synchronization process of FIG. 3.

Next, as shown in FIG. 8B, after the vehicle starts traveling, the amount of deviation $\Delta\theta$ is corrected such that the angle Ra becomes "0" and that the turning position of the turning wheels 5 has a predetermined correspondence relationship with the rotational position of the steering wheel 3.

Figure 9A:
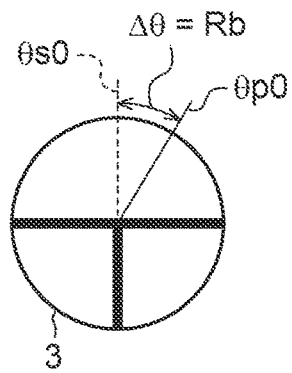
FIG. 9A is a view showing motion of the steering wheel during the steering angle synchronization process of FIG. 3.
Figure 9B:
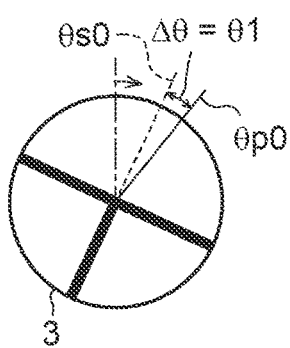
FIG. 9B is a view showing motion of the steering wheel during the steering angle synchronization process of FIG. 3.

FIG. 9A illustrates a case where the position of the turning wheels 5 at the start of execution of the steering angle synchronization process deviates from the rack neutral position toward the right side that is the positive value side (step 403: YES). For example, the amount of deviation $\Delta\theta$ upon completion of the steering angle midpoint correction process is an angle Rb having a value larger than the first threshold value θ1 and equal to or smaller than the second threshold value θ2. In this case, as shown in FIG. 9B, the steering wheel 3 is automatically rotated in the steering angle synchronization process, and the steering angle synchronization process is thereby ended in a state of having the amount of deviation Δθ of the first threshold value θ1.

Figure 9C:
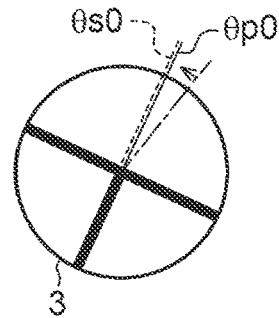
FIG. 9C is a view showing motion of the steering wheel during the steering angle synchronization process of FIG. 3.

Next, as shown in FIG. 9C, after the vehicle starts traveling, the amount of deviation Δθ is corrected such that the first threshold value θ1 becomes "0" and that the turning position of the turning wheels 5 has a predetermined correspondence relationship with the rotational position of the steering wheel 3.

Figure 10A:
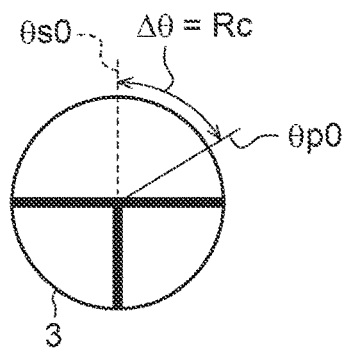
FIG. 10A is a view showing motion of the steering wheel during the steering angle synchronization process of FIG. 3.
Figure 10B:
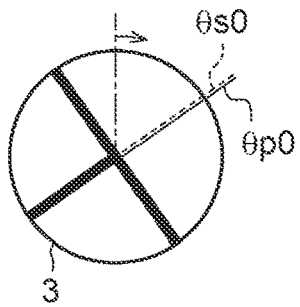
FIG. 10B is a view showing motion of the steering wheel during the steering angle synchronization process of FIG. 3.

FIG. 10A illustrates a case where the position of the turning wheels 5 at the start of execution of the steering angle synchronization process deviates from the rack neutral position toward the right side that is the positive value side (step 403: NO). For example, the amount of deviation Δθ upon completion of the steering angle midpoint correction process is an angle Rc having a value larger than the second threshold value θ2. In this case, as shown in FIG. 10B, the steering wheel 3 is automatically rotated in the steering angle synchronization process, and the steering angle synchronization process is thereby ended in a state of having the amount of deviation Δθ reduced to "0."

Workings and Advantages of Embodiment

Even when the preparation process including the steering angle midpoint correction process and the steering angle synchronization process is being executed, the CPU 49a can forcedly end the preparation process being executed if the first forced-ending condition or the second forced-ending condition is met and time runs out.

For example, as shown in FIG. 11, the preparation process is started from time t6 at which the start switch 48 is switched to the on state (START SWITCH "OFF" to "ON" in FIG. 11). Thus, the steering angle midpoint correction process or the steering angle synchronization process is executed that involves automatically rotating the steering wheel 3 etc. In this case, the CPU 49a outputs the steering state signal RD1 (STEERING CONTROL UNIT "OFF" to "ON" in FIG. 11). The steering state signal RD1 output is input into the vehicle control unit 7.

Thus, as shown in the state of the vehicle control unit of FIG. 11, the CPU 7a of the vehicle control unit 7 controls the operation of the notification device 9 so as to make a notification with the notification content H1 for system start-up. For example, as shown in FIG. 12A, the display device HS of the notification device 9 displays a message image M1 "SYSTEM IS STARTING" as the notification content H1 for system start-up. As the image is displayed on the display device HS, the driver can learn that the preparation process is being executed.

Next, as shown in FIG. 11, after the start switch 48 is switched to the on state, the preparation process is suspended from time t7 at which the continuation condition is not met and therefore it is determined that there is intervention by the driver (DRIVER'S INTERVENTION "OFF" to "ON" in FIG. 11). Thus, the steering angle midpoint correction process or the steering angle synchronization process is suspended due to automatic rotation of the steering wheel 3 being hindered etc. In this case, the CPU 49a outputs the steering state signal RD2. The steering state signal RD2 output is input into the vehicle control unit 7.

Thus, as shown in the state of the vehicle control unit of FIG. 11, the CPU 7a of the vehicle control unit 7 controls the operation of the notification device 9 so as to make a notification with the notification content H2 for alarming. For example, as shown in IG. 12B, the display device HS of the notification device 9 displays a message image M2 "TAKE YOUR HANDS OFF STEERING WHEEL" as the notification content H2 for alarming. As the image is displayed on the display device HS, the driver can learn that he or she is prompted to eliminate the intervention that is hindering automatic rotation of the steering wheel 3.

Next, as shown in FIG. 11, after it is determined that there is intervention by the driver, the preparation process is resumed from time t8 at which the continuation condition is met and therefore it is determined that there is no longer intervention by the driver (DRIVER'S INTERVENTION "ON" to "OFF" in FIG. 11). Thus, automatic rotation of the steering wheel 3 is resumed and the steering angle midpoint correction process or the steering angle synchronization process is resumed. In this case, the CPU 49a stops outputting the steering state signal RD2.

Thus, as shown in the state of the vehicle control unit of FIG. 11, the CPU 7a of the vehicle control unit 7 controls the operation of the notification device 9 so as to stop making a notification with the notification content H2 for alarming and make a notification with the notification content H1 for system start-up. From the change in the image displayed on the display device HS, the driver can learn that the preparation process will be resumed as he or she has eliminated the intervention that hinders automatic rotation of the steering wheel 3.

Next, as shown in FIG. 11, after it is determined that there is no longer intervention by the driver, the preparation process is forcedly ended at time t9 at which the first forced-ending condition or the second forced-ending condition is met and time runs out. In this case, the CPU 49a stops outputting the steering state signal RD1 and outputs either the steering state signal RD3 or the steering state signal RD4. The steering state signal RD3 or the steering state signal RD4 output is input into the vehicle control unit 7. Thus, the CPU 7a of the vehicle control unit 7 controls the operation of the notification device 9 so as to make either a notification with the notification content H3 for system malfunction or a notification with the notification content H4 for power source restart-up.

For example, as shown in FIG. 12C, the display device HS of the notification device 9 displays a message image M3 "HAVE YOUR CAR REPAIRED AND INSPECTED" as the notification content H3 for system malfunction. From the image displayed on the display device HS, the driver can learn that the preparation process has run out of time due to system malfunction. In this case, the driver can also learn that it is necessary to have his or her car repaired and inspected.

As shown in FIG. 12D, the display device HS of the notification device 9 displays a message image M4 "RESTART POWER SOURCE" as the notification content H4 for power source restart-up. From the image displayed on the display device HS, the driver can learn that the preparation process has run out of time due to intervention that hinders automatic rotation of the steering wheel 3. In this case, the driver can also learn that it is necessary to restart the power source to enable the vehicle to travel.

Thus, when forcedly ending the preparation process due to the first forced-ending condition or the second forced-ending condition being met during execution of the preparation process, the CPU 49a outputs either the steering state signal RD3 or the steering state signal RD4 to notify the driver to that effect. The notification device 9 makes a notification with the content corresponding to the steering state signal RD3 or the steering state signal RD4 that has been output.

For example, when the preparation process being executed is forcedly ended, the period until the normal process for the steering device 2 becomes possible becomes prolonged. In this case, the driver can learn, through the notification with the notification content H3 or the notification content H4, that the reason why the period until the normal process for the steering device 2 becomes possible is being prolonged is due to forced ending of the preparation process being executed.

Thus, even when the period until the normal process for the steering device 2 becomes possible is being prolonged, the driver is less likely to feel anxiety. The embodiment having been described above can further produce the workings and advantages described below.

The CPU 49a of the steering control unit 1 is configured to mainly execute control of the steering device 2. The CPU 7a of the vehicle control unit 7 is configured to mainly execute other control than control of the steering device 2. Thus, the forced-ending condition determination process, the forced-ending process, and the notification process that are executed in relation to the preparation process can be allocated as functions of the CPU 49a of the steering control unit 1 or the CPU 7a of the vehicle control unit 7. For example, the processes of step 105 and step 106, the processes of step 108 and step 110, and the processes of step 109 and step 111 are allocated as functions of the CPU 49a. The process for controlling the operation of the notification device 9 is allocated as a function of the CPU 7a. Thus, functions of the CPU 49a or the CPU 7a can be appropriately allocated.

The CPU 49a is configured to execute, in the start-up state, the process of step 107 of determining the cause due to which the forced-ending condition is met. The processes of step 109 and step 111 that the CPU 49a executes are processes of specifying the notification content H3 and the notification content H4 that are different from each other based on the determination result of the process of step 107. The notification content H3 and the notification content H4 are contents that can prompt the driver to act subsequently according to the cause due to which the forced-ending condition is met. Thus, the driver can learn the cause when the preparation process is forcedly ended. In this case, the driver can take measures according to the cause. This is effective for eliminating the anxiety caused to the driver when the period until the normal process for the steering device 2 becomes possible is being prolonged.

The operation member is the steering wheel 3 that can rotate in the leftward and rightward directions. The preparation process includes the steering angle midpoint correction process and the steering angle synchronization process. The steering angle midpoint correction process includes the process of automatically rotating the steering wheel 3 and thereby calculating the steering-side midpoint information θns that is a reference position for defining the rotational position of the steering wheel 3. The steering angle synchronization process includes the process of automatically rotating the steering wheel 3 and thereby synchronizing the rotational position of the steering wheel 3 and the turning position of the turning wheels 5 such that the positional relationship corresponds to a predetermined positional relationship. The first forced-ending condition and the second forced-ending condition, i.e., the threshold time Tath and the threshold time Tbth have different values from each other. Accordingly, in the case where the preparation process includes the steering angle midpoint correction process and the steering angle synchronization process, the first forced-ending condition and the second forced-ending condition that are different from each other can be used. Thus, the first forced-ending condition and the second forced-ending condition can be rationalized.

Other Embodiments

The above-described embodiment may be changed as follows. The following other embodiments can be combined with one another within such a range that no technical inconsistency arises.

In the above-described embodiment, the preparation process should include at least either the steering angle midpoint correction process or the steering angle synchronization process. The other embodiment described here offers workings and advantages similar to those of the above-described embodiment.

In the above-described embodiment, the preparation process may include, in addition to or instead of the steering angle midpoint correction process and the steering angle synchronization process, an abnormality detection process of detecting whether the steering unit 4 is experiencing a mechanical abnormality. In the abnormality detection process, whether the turning unit 6 is experiencing a mechanical abnormality may be detected.

In the above-described embodiment, the threshold time Tath and the threshold time Tbth may be set to the same value. That is, as the first forced-ending condition and the second forced-ending condition, the same condition can be set. In this case, in the process of FIG. 3, the process of step 105 and the process of step 106 can be integrated.

In the above-described embodiment, the process of FIG. 3 should include at least either the process of step 105 or the process of step 106. The other embodiment described here offers workings and advantages similar to those of the above-described embodiment.

In the above-described embodiment, the process of step 107 may be omitted from the process of FIG. 3. In this case, the configuration may be such that, after step 106 yields a YES result, the processes of step 108 and step 109 are executed or the processes of step 110 and step 111 are executed. In the case of the configuration in which the processes of step 110 and step 111 are executed, the processes of step 108 and step 109 may be executed on the condition that the processes of step 110 and step 111 are repeated many times.

In the above-described embodiment, the configuration may be such that the process of step 107 is executed after a process corresponding to the process of step 108 or step 110. In the above-described embodiment, the processes of step 109 and step 111 may be realized as functions of the CPU 7a of the vehicle control unit 7. In this case, the CPU 49a of the steering control unit 1 should function to output information indicating a result of the process of step 107 to the vehicle control unit 7.

In the above-described embodiment, the processes of step 105 to step 107, step 109, and step 111 may be realized as functions of the CPU 7a of the vehicle control unit 7. In this case, the CPU 49a of the steering control unit 1 should function to output information indicating results of the processes of step 103 and step 104 to the vehicle control unit 7. In addition, the CPU 7a may be configured to execute, in the process of FIG. 4, the processes of step 203, step 204, etc. of determining whether the continuation condition is met. In this case, the torque sensor 41 should be connected to the CPU 7a. Further, the processes of step 203, step 204, etc. of determining whether the continuation condition is met may be omitted from the process of FIG. 4.

In the above-described embodiment, the notification device 9 may be realized as a part of the configuration of the steering device 2. For example, the notification device 9 may be provided in the steering wheel 3. In this case, the processes of step 109 and step 111 may be substituted by processes of controlling the operation of the notification device 9 so as to make notifications with the notification contents corresponding to the pieces of information intended to be output in the respective steps. In the other embodiment described here, all of the forced-ending condition determination process, the forced-ending process, and the notification process are allocated as functions of the CPU 49a of the steering control unit 1. Thus, the CPU 49a corresponds to the controller. In this case, the workings and the advantages of the above-described embodiment can be realized by the functions of the steering device 2, i.e., the steering control unit 1 alone.

In the above-described embodiment, the CPU 49a may execute a process of determining whether the power source has been started for the first time since battery replacement from the contents of the memory 49b and internally setting information corresponding to the battery replacement information FLG. In this case, the processes of step 201 of FIG. 4 and step 301 of FIG. 5 should be processes of retrieving the information corresponding to the battery replacement information FLG and determining whether the battery replacement condition is met.

In the above-described embodiment, the steering angle midpoint correction process or the steering angle synchronization process should be realized at least, for example, by the steering-side process. In the above-described embodiment, the turning-side process of the steering angle midpoint correction process or the steering angle synchronization process can be realized as a process of automatically turning the turning wheels 5 like the steering-side process.

In the above-described embodiment, the procedure of the steering-side process in the steering angle midpoint correction process is not limited to the procedure shown in FIG. 4 but can be changed as appropriate. For example, the order of processing may be changed such that step 202 to step 206 shown in FIG. 4 are executed after the processes of step 207 to step 211.

In the above-described embodiment, the processes of step 215 to step 218 may be omitted from the steering-side process in the steering angle midpoint correction process, i.e., the process of FIG. 4. Further, the processes of step 215 to step 218 may be processes of rotating the steering wheel 3 to the temporary right limit position θrl or the temporary left limit position θll. That is, the processes of step 215 to step 218 may be any processes for allowing the position of the steering wheel 3 to reach a predefined position upon completion of the steering angle midpoint correction process.

In the above-described embodiment, it is not essential that the target reaction force torque calculator 52 calculates the target reaction force torque TT* using the steering torque Th, the vehicle speed V, the turning-side actual current value Ib, the steering angle θs, and the pinion angle θp as an input. For example, the target reaction force torque TT* may be calculated using the steering torque Th and the vehicle speed V as an input.

In the above-described embodiment, the process in the pinion angle calculator 61 may be a process of converting a detection value of an amount of movement of the rack shaft 22 into the pinion angle θp. In this case, unlike the above-described embodiment, the control amount relating to the pinion angle θp etc. is converted by the detection value of the amount of movement of the rack shaft 22. In the other embodiment described here, the detection value of the amount of movement of the rack shaft 22 corresponds to a state variable obtained from the turning unit 6.

In the above-described embodiment, the amount of shift of the steering wheel 3 is not limited to an amount calculated based on the process of integrating the rotation angle θa. For example, the amount of shift may be a detection value of a steering angle sensor that directly detects the rotation angle of the steering shaft 11. The steering angle sensor may be provided, for example, on the steering shaft 11, between the steering wheel 3 and the torque sensor 41.

In the above-described embodiment, the operation member that the driver operates to steer the vehicle is not limited to the steering wheel 3. For example, the operation member may be a joystick. In the above embodiment, the steering-side motor 13 mechanically coupled to the steering wheel 3 is not limited to a three-phase brushless motor. For example, the steering-side motor 13 may be a direct-current motor with a brush.

In the above-described embodiment, it is not essential to include the steering-side speed reduction mechanism 14. In the above-described embodiment, the turning unit 6 transmits the rotation of the turning-side motor 32 to the conversion mechanism 34 through the transmission mechanism 33. However, without being limited thereto, the turning unit 6 may be configured to transmit the rotation of the turning-side motor 32 to the conversion mechanism 34 through a gear mechanism, for example. Further, the turning unit 6 may be configured such that the turning-side motor 32 directly rotates the conversion mechanism 34. Further, the configuration of the turning unit 6 may include a second rack-and-pinion mechanism, and the turning unit 6 may be configured to convert the rotation of the turning-side motor 32 into reciprocating motion of the rack shaft 22 by the second rack-and-pinion mechanism.

In the above-described embodiment, the turning unit 6 is not limited to the configuration in which the right turning wheel 5 and the left turning wheel 5 operate in conjunction with each other. In other words, the right turning wheel 5 and the left turning wheel 5 may be controllable independently of each other.

In the above-described embodiment, the steering device 2 has a link-less structure in which the steering unit 4 and the turning unit 6 are always mechanically cut off from each other. However, without being limited thereto, the steering device 2 may have a structure in which the steering unit 4 and the turning unit 6 can be mechanically separated from each other by, for example, a clutch.

What is claimed is:

1. A vehicle control unit that controls a steering device of a vehicle, the steering device having a structure in which a power transmission path between a steering unit having an operation member and a turning unit configured to turn turning wheels is cut off, the vehicle control unit comprising a controller configured to make a state transition to a normal control state via a start-up state after a power source system of the vehicle is started, the start-up state being a state where it is possible to execute a preparation process, required for making a state transition to the normal control state, by controlling the operation member so as to move automatically, the normal control state being a state where it is possible to execute a normal process for turning the turning wheels according to operation of the operation member by a driver, wherein the controller is configured to execute, in the start-up state:
- a forced-ending condition determination process of determining whether a forced-ending condition showing that the preparation process being executed is to be forcedly ended from start of execution of the preparation process is met;
- a forced-ending process of forcedly ending the preparation process being executed when the forced-ending condition is met; and
- a notification process of notifying the driver of forced ending of the preparation process, wherein the preparation process includes a correction process including a process of calculating a reference position for defining a position of the operation member, and wherein the controller is configured to execute the forced-ending process before the reference position is calculated by the correction process when the forced-ending condition is met.

2. The vehicle control unit according to claim 1, wherein the controller includes a steering controller that mainly executes control of the steering device and a vehicle controller that mainly executes control other than control of the steering device.

3. The vehicle control unit according to claim 2, wherein:
the vehicle includes a notification device provided independently of the steering device;
the notification device is configured to, when the forced-ending condition is met, execute notification to the driver that the preparation process being executed is to be forcedly ended;
the steering controller is configured to execute the forced-ending condition determination process, the forced-ending process, and some processes of the notification process; and
the vehicle controller is configured to execute remaining processes of the notification process other than the some processes, the some processes including a notification content specification process of specifying a notification content showing a content to be notified to the driver, the remaining processes including a notification control process of controlling the notification device so as to make a notification according to the notification content specified by the notification content specification process.

4. The vehicle control unit according to claim 3, wherein:
the controller includes executing, in the start-up state, a cause-for-ending determination process of determining a cause due to which the forced-ending condition is met; and
the notification content specification process is a process of specifying, based on the cause due to which the forced-ending condition is met, the notification content that varies according to the cause, and the notification content includes a content that allows a driver to be prompted to act subsequently according to the cause due to which the forced-ending condition is met.

5. The vehicle control unit according to claim 1, wherein:
the operation member is a steering wheel capable of rotating in leftward and rightward directions; and
the controller is configured to execute calculating the reference position by automatically rotating the steering wheel.

6. The vehicle control unit according to claim 5, wherein:
the preparation process includes a synchronization process;
the synchronization process includes a process of synchronizing the position of the steering wheel and a turning position of the turning wheels by automatically rotating the steering wheel such that a positional relationship between the position and the turning position corresponds to a predetermined positional relationship; and
a condition of the correction process for the forced-ending condition differs from a condition of the synchronization process for the force-ending condition.

7. A vehicle control unit that controls a steering device of a vehicle, the steering device having a structure in which a power transmission path between a steering unit having an operation member and a turning unit configured to turn turning wheels is cut off,
the vehicle control unit comprising a controller configured to make a state transition to a normal control state via a start-up state after a power source system of the vehicle is started, the start-up state being a state where it is possible to execute a preparation process, required for making a state transition to the normal control state, by controlling the operation member so as to move automatically, the normal control state being a state where it is possible to execute a normal process for turning the turning wheels according to operation of the operation member by a driver, wherein the controller is configured to execute, in the start-up state:
- a forced-ending condition determination process of determining whether a forced-ending condition showing that the preparation process being executed is to be forcedly ended from start of execution of the preparation process is met;
- a forced-ending process of forcedly ending the preparation process being executed when the forced-ending condition is met; and
- a notification process of notifying the driver of forced ending of the preparation process, wherein the preparation process includes a synchronization process, wherein the synchronization process includes a process of synchronizing a position of the operation member and a turning position of the turning wheels by automatically moving the operation member such that a positional relationship between the position and the turning position corresponds to a predetermined positional relationship, and wherein the controller is configured to execute the forced-ending process before the synchronizing is completed by the synchronization process when the forced-ending condition is met after a start of the automatically moving the operation member.

8. A vehicle control method for controlling a steering device of a vehicle, the steering device having a structure in which a power transmission path between a steering unit having an operation member and a turning unit configured to turn turning wheels is cut off, the vehicle control method comprising:
making a state transition to a normal control state via a start-up state in response to a power source system of the vehicle being started, the start-up state being a state where it is possible to execute a preparation process, required for making a state transition to the normal control state, by controlling the operation member so as to move automatically, the normal control state being a state where it is possible to execute a normal process for turning the turning wheels according to operation of the operation member by a driver, wherein the vehicle control method includes executing the following in the start-up state:

a forced-ending condition determination process of determining whether a forced ending condition showing that the preparation process being executed is to be forcedly ended from start of execution of the preparation process is met;

a forced-ending process of forcedly ending the preparation process being executed in response to the forced-ending condition being met; and a notification process of notifying the driver of forced ending of the preparation process, wherein the preparation process includes a correction process including a process of calculating a reference position for defining a position of the operation member, and wherein the forced-ending process is executed before the reference position is calculated by the correction process in response to the forced-ending condition being met.

9. A vehicle control method for controlling a steering device of a vehicle, the steering device having a structure in which a power transmission path between a steering unit having an operation member and a turning unit configured to turn turning wheels is cut off, the vehicle control method comprising:

making a state transition to a normal control state via a start-up state in response to a power source system of the vehicle being started, the start-up state being a state where it is possible to execute a preparation process, required for making a state transition to the normal control state, by controlling the operation member so as to move automatically, the normal control state being a state where it is possible to execute a normal process for turning the turning wheels according to operation of the operation member by a driver, wherein the vehicle control method includes executing the following in the start-up state:

a forced-ending condition determination process of determining whether a forced ending condition showing that the preparation process being executed is to be forcedly ended from start of execution of the preparation process is met;

a forced-ending process of forcedly ending the preparation process being executed in response to the forced-ending condition being met; and a notification process of notifying the driver of forced ending of the preparation process, wherein the preparation process includes a synchronization process, wherein the synchronization process includes a process of synchronizing a position of the operation member and a turning position of the turning wheels by automatically moving the operation member such that a positional relationship between the position and the turning position corresponds to a predetermined positional relationship, and wherein the forced-ending process is executed before the synchronizing is completed by the synchronization process in response to the forced-ending condition being met after a start of the automatically moving the operation member.

* * * * *